(12) United States Patent
Fukuda

(10) Patent No.: US 7,642,952 B2
(45) Date of Patent: Jan. 5, 2010

(54) SPREAD SPECTRUM RADAR APPARATUS

(75) Inventor: Takeshi Fukuda, Osaka (JP)

(73) Assignee: Panasonic Corporation, Osaka (JP)

( * ) Notice: Subject to any disclaimer, the term of this patent is extended or adjusted under 35 U.S.C. 154(b) by 72 days.

(21) Appl. No.: 11/816,794

(22) PCT Filed: Mar. 29, 2006

(86) PCT No.: PCT/JP2006/306549

§ 371 (c)(1),
(2), (4) Date: Aug. 21, 2007

(87) PCT Pub. No.: WO2006/106774

PCT Pub. Date: Oct. 12, 2006

(65) Prior Publication Data

US 2009/0015464 A1   Jan. 15, 2009

(30) Foreign Application Priority Data

Mar. 31, 2005   (JP) .............................. 2005-104109

(51) Int. Cl.
*G01S 7/28* (2006.01)
*G01S 7/282* (2006.01)
*G01S 7/285* (2006.01)
*H04B 1/69* (2006.01)
*H04B 1/707* (2006.01)
*G01S 13/00* (2006.01)
*G01S 13/93* (2006.01)

(52) U.S. Cl. .................. 342/175; 342/70; 342/82; 342/89; 342/118; 342/134; 342/135; 342/145; 342/195; 375/130; 375/140; 375/146; 375/147; 375/150

(58) Field of Classification Search ......... 375/130–153; 342/21, 27, 28, 70–72, 82–103, 175, 195, 342/61, 118, 120–122, 200–205, 127–145
See application file for complete search history.

(56) References Cited

U.S. PATENT DOCUMENTS 4,443,799 A * 4/1984 Rubin ........................ 342/201

(Continued)

FOREIGN PATENT DOCUMENTS

JP   1-308985   12/1989

(Continued)

OTHER PUBLICATIONS

English language Abstract and partial translation of JP 2001-168835.

(Continued)

*Primary Examiner*—Bernarr E Gregory
(74) *Attorney, Agent, or Firm*—Greenblum & Bernstein, P.L.C.

(57) ABSTRACT

A spread spectrum radar apparatus includes: a transmission unit which generates a spread signal that is a spectrum-spread signal, using a first oscillator signal, a second oscillator signal, and a transmission PN code, and which emits the spread signal as a detection radio wave; and a reception unit which receives, as a reception signal, the detection radio wave reflected from an object, and which generates an intermediate frequency signal by despreading the reception signal based on the first oscillator signal and a reception PN code obtained by delaying the transmission PN code.

22 Claims, 13 Drawing Sheets

U.S. PATENT DOCUMENTS

| | | | |
|---|---|---|---|
| 4,679,048 A * | 7/1987 | Brandsetter et al. | 342/61 |
| 4,758,839 A * | 7/1988 | Goebel et al. | 342/122 |
| 4,759,034 A * | 7/1988 | Nagazumi | 375/142 |
| 4,953,178 A * | 8/1990 | Ishigaki | 375/141 |
| 4,958,359 A * | 9/1990 | Kato | 375/141 |
| 4,977,578 A * | 12/1990 | Ishigaki et al. | 375/140 |
| 5,199,045 A * | 3/1993 | Kato | 375/141 |
| 5,291,202 A * | 3/1994 | McClintock | 375/130 |
| 5,731,781 A | 3/1998 | Reed | |
| 6,801,153 B2 * | 10/2004 | Rauch et al. | 342/21 |
| 7,460,055 B2 * | 12/2008 | Nishijima et al. | 342/70 |
| 2003/0090405 A1 * | 5/2003 | Rauch et al. | 342/21 |
| 2007/0109175 A1 | 5/2007 | Fukuda | |

FOREIGN PATENT DOCUMENTS

| | | |
|---|---|---|
| JP | 7-012930 | 1/1995 |
| JP | 7-038463 | 2/1995 |
| JP | 11-003498 | 1/1999 |
| JP | 11-094934 | 4/1999 |
| JP | 11-166971 | 6/1999 |
| JP | 2990097 | 10/1999 |
| JP | 11-352217 | 12/1999 |
| JP | 2000-321351 | 11/2000 |
| JP | 2001-033542 | 2/2001 |
| JP | 2001-168835 | 6/2001 |

OTHER PUBLICATIONS

English language Abstract and partial translation of JP 11-166971.
English language Abstract and partial translation of JP 2000-321351.
English language Abstract and partial translation of JP 11-003498.
English language Abstract and partial translation of JP 11-352217.
English language Abstract and partial translation of JP 7-038463.
English language Abstract and partial translation of JP 1-308985.
English language Abstract and partial translation of JP 11-094934.
English language Abstract and partial translation of JP 2001-033542.
English language Abstract of JP 7-012930.
English language Abstract of JP 10-054874.
U.S. Appl. No. 11/756,763 to Nishijima et al., which was filed on Jun. 1, 2007.

* cited by examiner

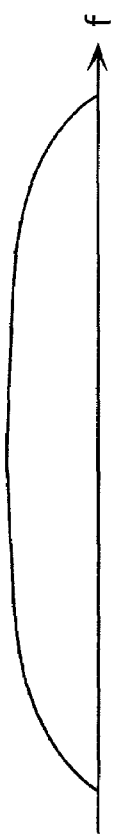
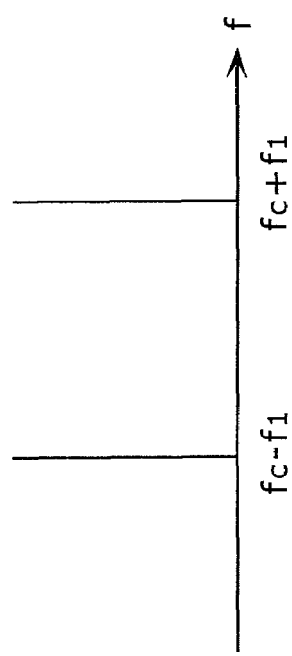
FIG. 4A
FIG. 4B
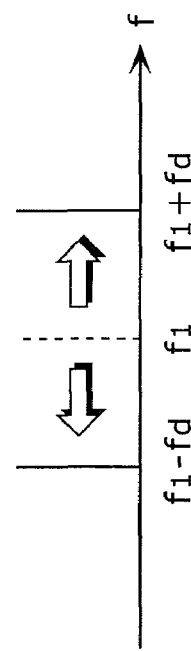
FIG. 4C
FIG. 4D

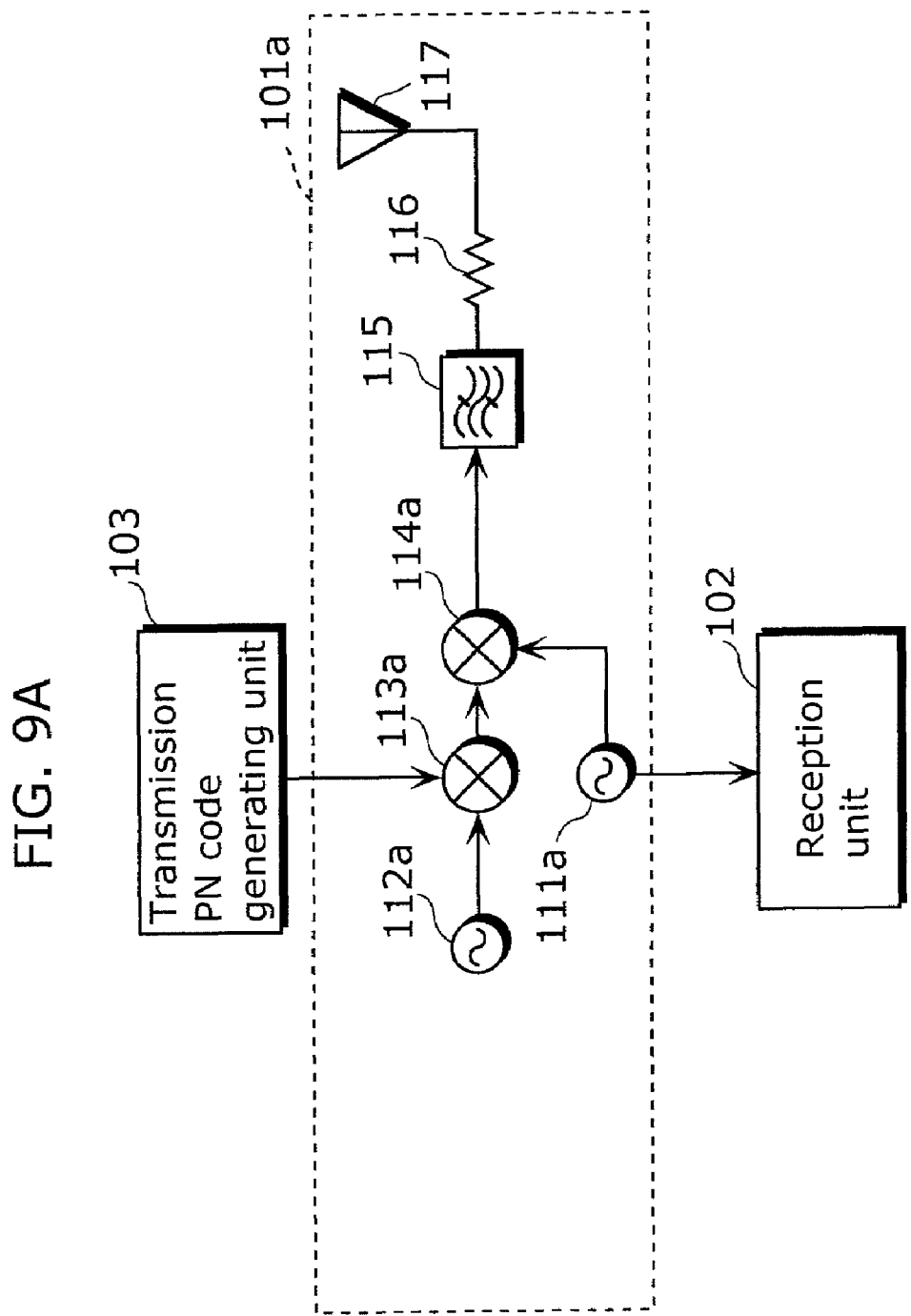

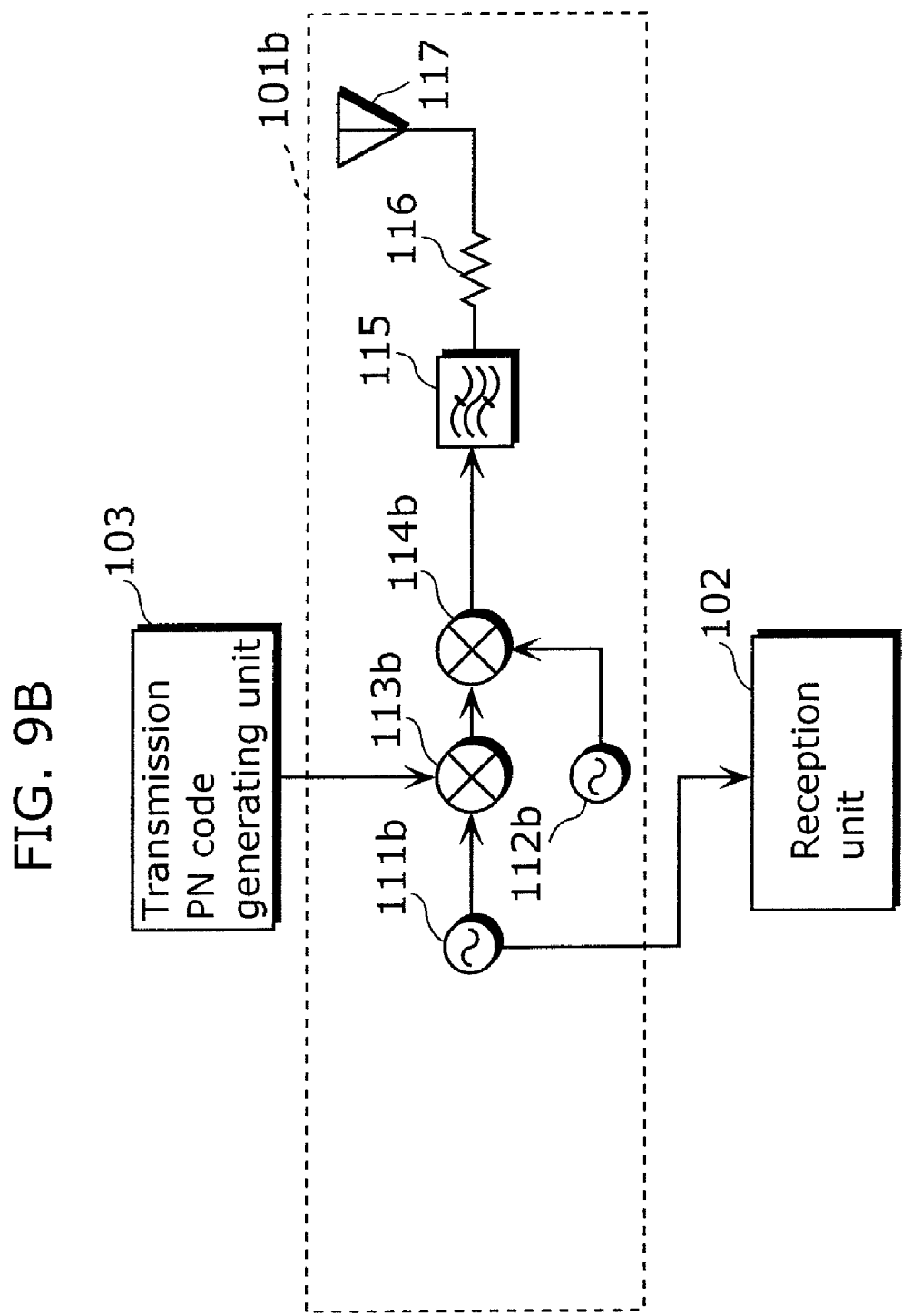

SPREAD SPECTRUM RADAR APPARATUS

TECHNICAL FIELD

The present invention relates to a radar apparatus using a spread spectrum method, and particularly to a spread spectrum radar apparatus which is inexpensive, has a wide detection range, and provides high performance.

BACKGROUND ART

In recent years, technical development on radar apparatuses installed in vehicles (hereinafter referred to as on-vehicle radar apparatuses) is actively underway. As one of the examples, a radar apparatus using a spread spectrum method (hereinafter referred to as a spread spectrum radar apparatus) and the like has been suggested (for example, refer to Patent Reference 1).

On-vehicle radar apparatuses are used to detect a preceding vehicle, a rear obstacle, and the like, for the purpose of safety improvement such as collision avoidance and enhancement of the driving convenience represented by reverse driving support. When the on-vehicle radar apparatuses are used for such purposes, it is necessary to suppress an effect of an undesired radio wave generated from other radar apparatuses of the same type installed in vehicles other than the own vehicle, such as an effect of interference by an electromagnetic wave.

In contrast, since a transmission radio wave is modulated in a spread spectrum radar apparatus using a PN code for spectrum spreading, a signal caused by a radio wave which is modulated in a different code and a signal outputted from a radar apparatus using another modulation method which does not use code are suppressed within a receiver. Furthermore, since the transmission radio wave is frequency-spread using the PN code, it is possible to reduce the electric power on a frequency unit basis and thus to reduce the effect on other wireless systems. It is also possible to freely set a relationship between distance resolution and a maximum detectable range by adjusting a chip rate and a code cycle of the PN code. The peak power never becomes large since continuous transmission of a radio wave is possible. Note that an undesired radio wave mixed into a transmission radio wave is spread over a wide band in a frequency domain even when a despreading process is performed, and unnecessary noise and an interference signal are suppressed using a filter for a narrow band.

Furthermore, the spread spectrum radar apparatuses are classified into a heterodyne method type and a homodyne method type depending on the configuration of the receiver.

The heterodyne method is a method of receiving a signal that converts a frequency into an intermediate frequency by mixing (multiplying) a reception signal and a signal having a frequency different from a frequency of the corresponding transmission signal by a predetermined frequency, and that performs signal processing, such as amplification and wave detection.

The homodyne method is a method of receiving a signal that directly obtains a baseband signal by mixing (multiplying) a reception signal and a signal having the same frequency as that of the transmission signal.

However, according to the aforementioned conventional technology, a frequency stabilizer using a phase-locked loop is necessary in each reception side and transmission side of the spread spectrum radar apparatus using a heterodyne method, and thus, there is a problem that it is difficult to lower the price of the apparatus. This is because it is necessary to control, in high precision, an oscillation frequency of local oscillators at the reception side and transmission side and to sufficiently stabilize, according to a pass band of a filter, an intermediate frequency which is a frequency difference between the reception side and transmission side. However, there is a characteristic that a problem to be described hereinafter which is unique to the homodyne method does not occur in a spread spectrum radar apparatus using the heterodyne method.

On the other hand, the spread spectrum radar apparatus using the homodyne method has problems, such as characteristic variations in semiconductor devices, direct current offsets caused by the variation in the ambient temperature, and thus, it is necessary to install a direct current amplifier. Since the detection range of the radar apparatus is set wide, it becomes a substantial obstacle when the dynamic range of the receiver is increased. By using a local oscillator which is common in the reception and transmission sides, it is possible to ease a degree of frequency stability required in an oscillator. This is possible because an output signal obtained by wave detection from the receiver includes a direct current component.

In order to solve this problem, the method of embedding data code in the PN code has been conceived (for example, refer to Patent Reference 2). The method has a characteristic in that the problem of the direct current offset does not occur in a receiver by using a local oscillator which is common in the reception and transmission sides.

Patent Reference 1: Japanese Unexamined Patent Application Publication No. 7-12930
Patent Reference 2: Japanese Unexamined Patent Application Publication No. 10-54874

DISCLOSURE OF INVENTION

Problems that Invention is to Solve

However, when the data code is embedded in the PN code, and spreading modulation is performed on a carrier signal using the PN code in which the data code has been embedded, there is a problem in that large numbers of spurious signals, which have an adverse effect on the receiving performance, frequently occur in a modulation signal obtained by performing the spreading modulation. The data code includes large numbers of basic frequencies and the harmonics. Therefore, compared to the cases where spreading modulation is performed on a carrier signal using only the PN code, large numbers of frequency components are included in a modulation signal, which is equivalent to the result obtained by multiplying the number of the harmonics included in the PN code and the number of the harmonics included in the data code. At this time, modulation is performed on each of the frequency components of the PN code itself, using the data code including the large numbers of harmonics components.

Then, when one of these frequency components is included in an intermediate frequency band used within a receiver, the frequency component is leaked from a reception unit, and the component is interfered with a reception signal. Even when the signals leaked from the reception unit are only a little in amount, the intensity of a detection radio wave which is reflected from an object has a very high dynamic range according to a distance to the object. Thus, it becomes an obstacle particularly when receiving a very weak reflected wave from an object in the distance.

Thus, the present invention has been conceived in view of the aforementioned problems. The object of the present invention is to provide a spread spectrum radar apparatus: which has a circuit configuration including a local oscillator used common in a reception and a transmission sides, but not requiring a direct current amplifier; which suppresses the occurrence of a spurious signal that impedes a receiving operation; and which is inexpensive, has a wide detection range, and provides high performance.

Means to Solve the Problems

In order to achieve the aforementioned object, the spread spectrum radar apparatus includes: (a) a transmission circuit which generates a spread signal that is a spectrum-spread signal, using a first oscillator signal, a second oscillator signal, and a first pseudo-noise code, and which emits the spread signal as a detection radio wave; and (b) a reception circuit which receives, as a reception signal, the detection radio wave reflected from an object, and which generates an intermediate frequency signal by despreading the reception signal based on the first oscillator signal and a second pseudo-noise code obtained by delaying the first pseudo-noise code, (c) wherein a frequency of the first pseudo-noise code is larger than a frequency of the second oscillator signal.

With this, it is possible to ease a degree of frequency stability required in an oscillator by using a oscillator which is common in a reception and a transmission sides, and to omit a function that stabilizes a frequency in high precision, such as a phase-locked loop. Furthermore, since a signal in which signal processing is performed does not include a direct current component, it is possible to omit a direct current amplifier, in particular. Furthermore, since the signal does not include a direct current component, it is not necessary to use the direct current amplifier, and thus, it is possible to amplify a signal while keeping the relatively wide dynamic range, without any effect of the direct current offset.

Note that the present invention can be implemented not only as a spread spectrum radar apparatus but also as a detection method using a spectrum-spread radio wave (hereinafter, referred to as spread spectrum detection method).

EFFECTS OF THE INVENTION

According to the present invention, it is possible to provide a spread spectrum radar apparatus which is configured of a circuit in which a local oscillator which is common in the reception and transmission sides is used but a direct current amplifier is not required, and which is inexpensive, has a wide detection range, and provides high performance.

Furthermore, in the conventional technology, an exclusive OR is calculated between the data supplied from a data source (bits) and the transmission PN code in the transmission side. Then, since the code obtained from the exclusive OR is modulated using an oscillator signal supplied from the local oscillator, large numbers of spectrum caused by the bits appear in each of the frequencies of spectrum for the signal obtained by the modulation. With this, the number of spectrums becomes large, inter-modulation occurs between those spectrums due to the non-linearity caused by a balanced modulator, an amplifier, and the like. With this, the despread processing in the receiving side deteriorates a correlation characteristic with the delaying PN code, and a ratio of noise to peak in output of the reception signal becomes lower. In other words, such case is equivalent to a case where an object having high reflectivity properties is masked by an object having low reflectivity properties. Thus, the object detection capability of the spread spectrum radar apparatus decreases.

For solving this, the spread spectrum radar apparatus according to the present invention uses a local oscillator, instead of the data source. Since the number of spectrums is less in a signal emitted from a transmission unit as a detection radio wave, such spectrums are less subject to the inter-modulation. Thus, it is possible to suppress the occurrence of spurious signals that impedes a receiving operation.

BRIEF DESCRIPTION OF DRAWINGS

FIG. 4A is a diagram showing a transmission dual-frequency signal in the spread spectrum radar apparatus according to the first embodiment.

FIG. 4B is a diagram showing a modulation signal obtained by modulating the dual-frequency transmission signal in the spread spectrum radar apparatus according to the first embodiment.

FIG. 4C is a diagram showing a reception signal of the spread spectrum radar apparatus according to the first embodiment.

FIG. 4D is a diagram showing a modulation signal obtained by modulating the reception signal in the spread spectrum radar apparatus according to the first embodiment.

FIG. 9A is a diagram showing the circuit configuration of a transmission unit according to the other variation embodiment.

FIG. 9B is a diagram showing the circuit configuration of a transmission unit according to the other variation embodiment.

NUMERICAL REFERENCES

Figure 1:
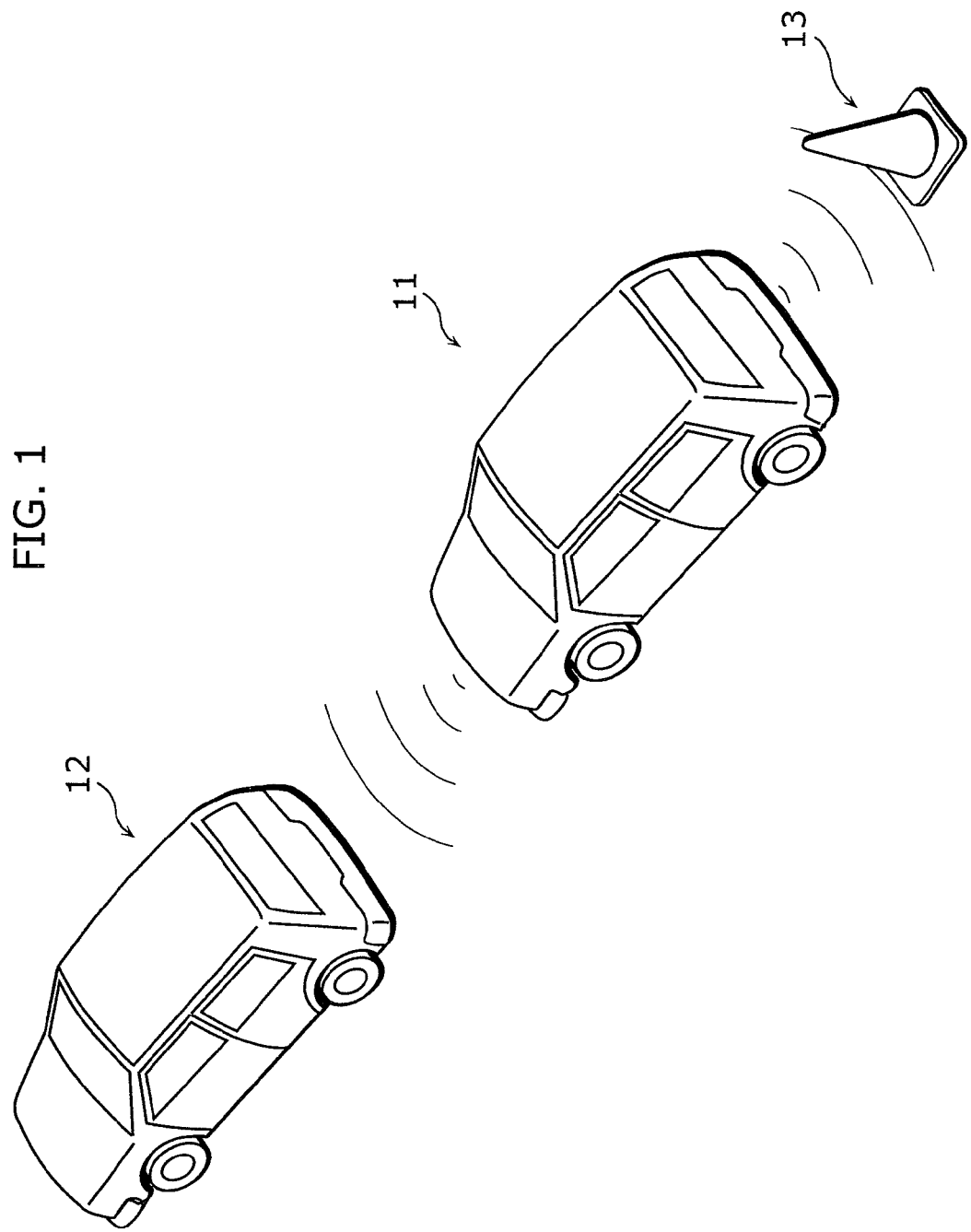
FIG. 1 is a diagram showing a case where a spread spectrum radar apparatus according to the first embodiment is an on-vehicle radar apparatus.

100 Spread spectrum radar apparatus
101, 101a, 101b Transmission unit
102 Reception unit
103 Transmission PN code generating unit
104 Reception PN code generating unit
105 Signal processing unit
106 Control unit
111, 111a, 111b Local oscillator
112, 112a, 112b Local oscillator 113, 113a, 113b Balanced modulator
114, 114a, 114b Balanced modulator
115 Band-pass filter
116 Attenuator
117 Transmission antenna
121 Reception antenna
122 Band-pass filter
123 Low noise amplifier
124 Balanced modulator
125 Quadrature demodulator
125a Phase shifter
125b Balanced modulator
125c Balanced modulator
126 Band-pass filter
127 Amplifier
128 Band-pass filter
129 Amplifier
200 Spread spectrum radar apparatus
202 Reception unit
205 Signal processing unit
206 Control unit
225 Quadrature demodulator
225a Phase shifter
225b Balanced modulator
226 Band-pass filter
227 Amplifier
300, 300a Spread spectrum radar apparatus
301 Transmission unit
306a Control unit
307 Random signal generating unit
311 Local oscillator
400a, 400b Spread spectrum radar apparatus
401a, 401b Transmission unit
408a, 408b Repetition code generator
409a, 409b Exclusive OR operator
412a, 412b Balanced modulator
413a Amplifier

BEST MODE FOR CARRYING OUT THE INVENTION

First Embodiment

Hereinafter, the first embodiment according to the present invention is described with reference to the diagrams.

The spread spectrum radar apparatus of the present embodiment includes the features (a) to (j) as shown below.

(a) The spread spectrum radar apparatus includes: (a1) a transmission circuit which generates a spread signal that is a spectrum-spread signal, using a first oscillator signal, a second oscillator signal, and a first pseudo-noise code, and which emits the spread signal as a detection radio wave; (a2) a reception circuit which receives, as a reception signal, the detection radio wave reflected from an object, and which generates an intermediate frequency signal by despreading the reception signal based on the first oscillator signal and a second pseudo-noise code obtained by delaying the first pseudo-noise code, and (a3) wherein a frequency of the first pseudo-noise code is larger than a frequency of the second oscillator signal.

(b) The reception circuit further includes: (b1) a balanced modulator which generates the modulation signal by modulating a phase of the reception signal based on the second pseudo-noise code; and (b2) a quadrature demodulator which outputs, as the intermediate frequency signal, an in-phase signal and a quadrature signal which are included in the modulation signal.

(c) The quadrature demodulator further includes: (c1) a phase shifter which generates a third oscillator signal in which a shift amount with respect to the first oscillator signal is different by 90 degrees; (c2) a first balanced modulator which generates the in-phase signal by mixing the modulation signal and the first oscillator signal; (c3) a second balanced modulator which generates the quadrature signal by mixing the modulation signal and the third oscillator signal.

(d) The reception circuit includes: (d1) a first band-pass filter to which the in-phase signal is inputted from the quadrature demodulator, and which allows a band from among frequency components of the in-phase signal to pass, the band having a frequency of the second oscillator signal as a center frequency; (d2) a second band-pass filter to which the quadrature signal is inputted from the quadrature demodulator, and which allows a band from among frequency components of the quadrature signal to pass, the band having the frequency of the second oscillator signal as the center frequency; (d3) a first amplifier which outputs a signal intensity and a signal amplified by limiting amplitude of a signal which has passed the first band-pass filter, the signal intensity being proportional to a logarithm of intensity of the signal which has passed the first band-pass filter; and (d4) a second amplifier which outputs a signal intensity and a signal amplified by limiting amplitude of a signal which has passed the second band-pass filter, the signal intensity being proportional to a logarithm of intensity of the signal which has passed the second band-pass filter.

(e) The transmission circuit generates an intermediate signal by mixing the first oscillator signal and the second oscillator signal, and generates the spread signal by modulating a phase of the intermediate signal based on the first pseudo-noise code.

(f) The transmission circuit further includes: (f1) a first local oscillator which generates the first oscillator signal; (f2) a second local oscillator which generates the second oscillator signal; (f3) a first balanced modulator which generates the intermediate signal by mixing the first oscillator signal and the second oscillator signal; and (f4) a second balanced modulator which generates the spread signal by modulating a phase of the intermediate signal based on the first pseudo-noise code.

(g) The spread spectrum radar apparatus further includes a signal processing circuit which calculates intensity of the reception signal based on the quadrature signal and the in-phase signal, checks the intensity with a reference value, and judges whether or not the object is present.

(h) The signal processing circuit further identifies time for which the first pseudo-noise code is delayed so as to generate the second pseudo-noise code, and calculates a distance to the object from the identified time, based on the in-phase signal and the quadrature signal.

(i) The signal processing circuit further calculates a phase of the reception signal based on the second oscillator signal, the in-phase signal, and the quadrature signal, and calculates a relative velocity for the object based on time variations in the phase.

The spread spectrum radar apparatus further includes: (j1) a first pseudo-noise code generating circuit which generates an M sequence code as the first pseudo-noise code; and (j2) a second pseudo-noise code generating circuit which generates the M sequence code as the second pseudo-noise code.

More specifically, the spread spectrum radar apparatus generates an intermediate signal by mixing the first oscillator signal and the second oscillator signal, generates the spread signal by modulating a phase of the intermediate signal based on the transmission PN code, and emits the spread signal as a detection radio wave. Then, the spread spectrum radar apparatus receives the detection radio wave reflected from an object, generates the modulation signal by modulating a phase of the reception signal based on the reception PN code, generates the in-phase signal and the quadrature signal which are included in the modulation signal based on the modulation signal and the first oscillator signal, and detects the object based on the in-phase signal and the quadrature signal.

For example, as shown in FIG. 1, the spread spectrum radar apparatuses are installed respectively in a front and a tail of the vehicle 11. Each of the apparatus emits a detection radio wave to an object, such as a preceding vehicle 12 and a obstacle 13, receives the detection radio wave reflected from the object, and calculates the presence or absence of the obstacle, a distance to the obstacle, and a relative velocity for the obstacle based on the received detection radio wave.

In view of the aforementioned points, the spread spectrum radar apparatus according to the present embodiment is described.

First, a configuration of the spread spectrum radar apparatus according to the present embodiment is described.

Figure 2:
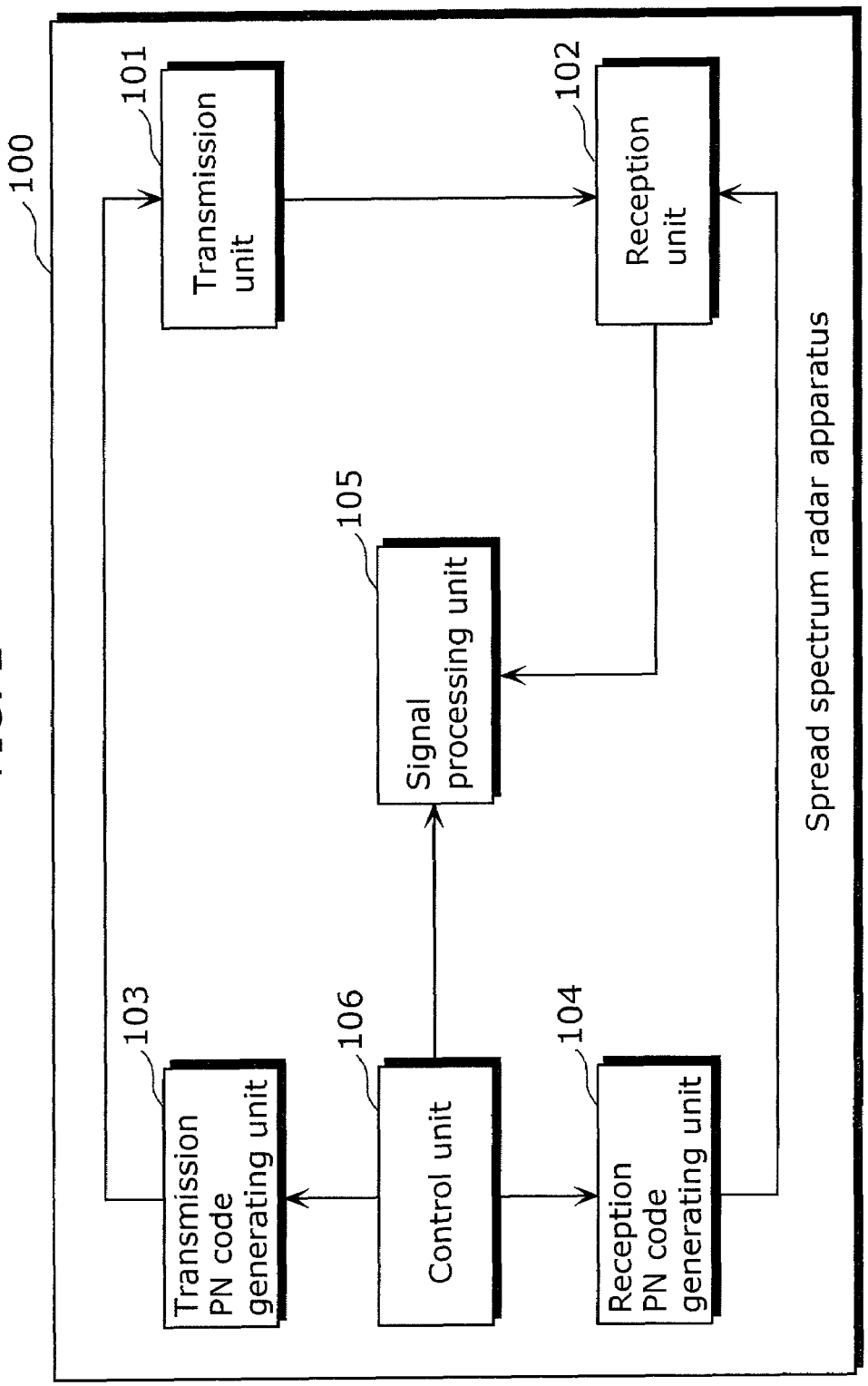
FIG. 2 is a diagram showing the configuration of the spread spectrum radar apparatus according to the first embodiment.

As shown in FIG. 2, for example, the spread spectrum radar apparatus 100 includes a transmission unit 101, a reception unit 102, a transmission PN code generating unit 103, a reception PN code generating unit 104, a signal processing unit 105, a control unit 106, and the like.

The transmission unit 101 emits a detection radio wave to an object, such as a preceding vehicle and an obstacle.

The reception unit 102 receives a detection radio wave reflected from the object.

The transmission PN code generating unit 103 generates a PN code based on a timing signal supplied from the control unit 106, and supplies the generated PN code to the transmission unit 101.

The reception PN code generating unit 104 generates a PN code obtained by delaying the PN code generated by the transmission PN code generating unit 103, based on a timing signal supplied from the control unit 106, and supplies the generated PN code to the reception unit 102.

The signal processing unit 105 calculates the presence or absence of an obstacle, a distance to the obstacle, and a relative velocity for the obstacle, based on: the code delay time τ of the reception PN code generating unit 104 to the transmission PN code generating unit 103; a reference signal supplied from the transmission unit 101; and a signal outputted from the reception unit 102.

The control unit 106 supplies a timing signal to the transmission PN code generating unit 103 and the reception PN code generating unit 104. Here, the control unit 106 supplies the timing signal at 2.5 Gbps.

"PN code" is a binary pseudo-noise signal. As an example, an M sequence code, which is well known as a PN code, is used here. Then, the transmission PN code generating unit 103 and the reception PN code generating unit 104 respectively include eleven-stage non-linear feedback shift registers, generates a PN code with a repetition cycle 2047, and supplies the PN code.

Next, the transmission unit according to the first embodiment is described.

Figure 3:
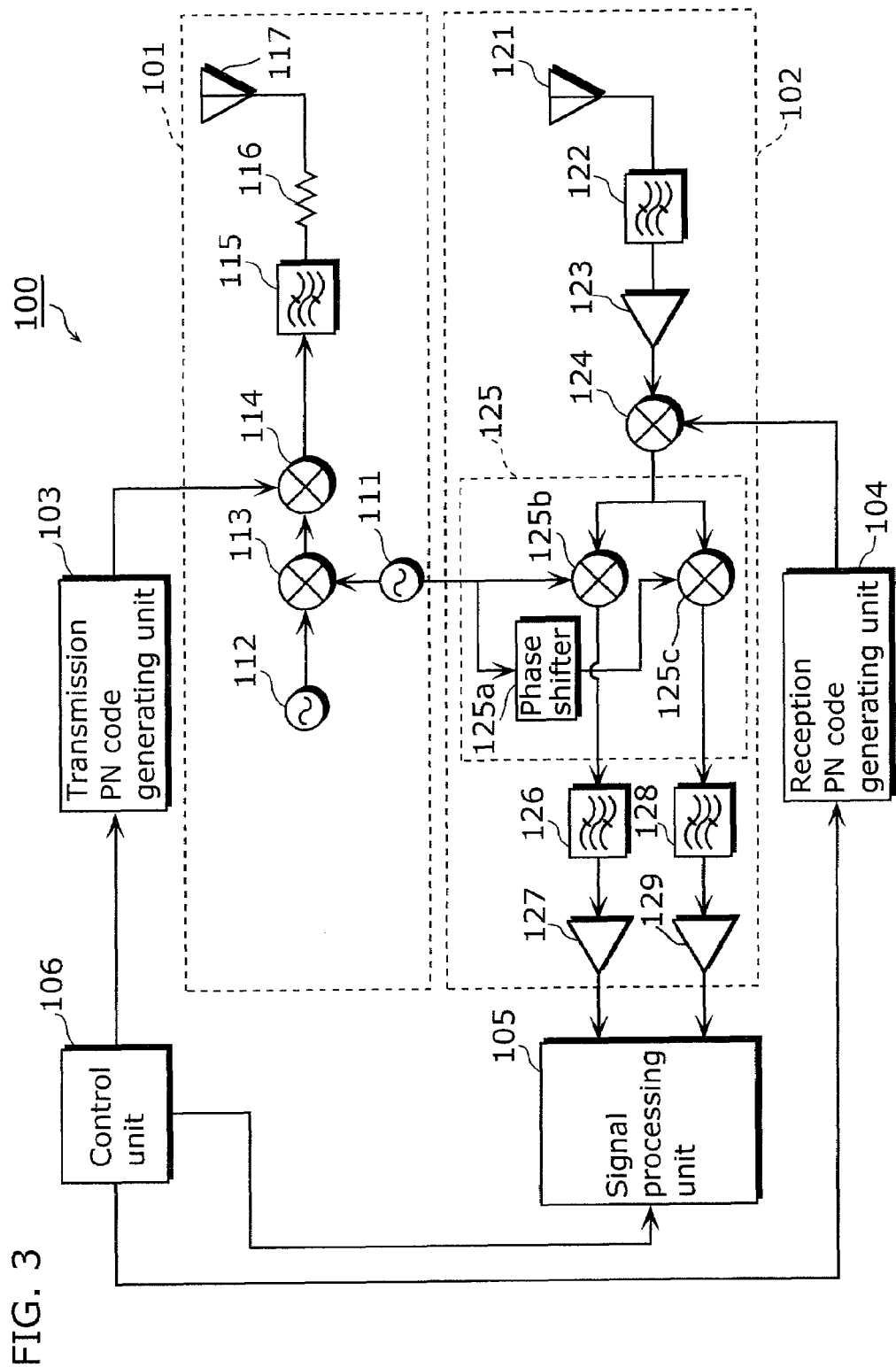
FIG. 3 is a diagram showing the circuit configuration of the spread spectrum radar apparatus according to the first embodiment.

As shown in FIG. 3, the transmission unit 101 further includes a local oscillator 111, a local oscillator 112, a balanced modulator 113, a balanced modulator 114, a band-pass filter 115, an attenuator 116, a transmission antenna 117, and the like.

The local oscillator 111 generates an oscillator signal in a microwave band or a millimeter waveband as a carrier wave, and supplies the generated signal to the balanced modulator 113 and the reception unit 102. Here, the local oscillator 111 generates the 24 GHz oscillator signal as an example herein.

The local oscillator 112 generates a reference signal, and supplies the generated reference signal to the balanced modulator 113 and the signal processing unit 105. Here, the local oscillator 112 generates a 455 kHz reference signal as an example herein.

Note that it is preferable that the frequency of the reference signal is one-integer-th of the frequency of the cycle of the PN code supplied from the transmission PN code generating unit 103 in order to improve the correlation characteristic of the reception signal.

The balanced modulator 113 mixes (multiplies) the oscillator signal supplied from the local oscillator 111 and the reference signal supplied from the local oscillator 112, and outputs the modulation signal shown in FIG. 4A. In this case, assuming that the frequency of the oscillator signal supplied from the local oscillator 111 is $f_c$ and the frequency of the reference signal supplied from the local oscillator 112 is $f_1$, the primary components of the outputted signal includes a dual-frequency signal having $f_c - f_1$ frequency and having $f_c + f_1$ frequency.

The balanced modulator 114 modulates a phase of the modulation signal outputted from the balanced modulator 113 based on the PN code supplied from the transmission PN code generating unit 103, and outputs the modulation signal shown in FIG. 4B. In this case, the balanced modulator 114 performs spreading processing on the signal outputted from the transmission PN code generating unit 113 using the PN code supplied from the transmission PN code generating unit 103. More specifically, the balanced modulator 114 inverts the phase of the signal upconverted by the balanced modulator 113 based on the PN code supplied from the transmission PN code generating unit 103. Then, the balanced modulator 114 modulates the phase of the signal outputted from the balanced modulator 113, as with the BPSK modulator, and outputs the signal which is spectrum spread over a wide band.

The band-pass filter 115 is inserted as necessary in order to remove unnecessary components from the modulation signal outputted from the balanced modulator 114, in other words, the signal in which spread processing has been performed.

The attenuator 116 is inserted as necessary when transmission antenna power is regulated in accordance with radio laws and regulations.

The transmission antenna 117 is an antenna which emits, as a detection radio wave, the modulation signal outputted from the balanced modulator 114 via the band-pass filter 115, the attenuator 116, and the like.

Next, the reception unit according to the first embodiment is described.

As shown in FIG. 3, the reception unit 102 further includes a reception antenna 121, a band-pass filter 122, a low noise amplifier 123, a balanced modulator 124, a quadrature demodulator 125, band-pass filters 126 and 128, amplifiers 127 and 129, and the like.

The reception antenna 121 is an antenna which receives a detection radio wave reflected from an object as a reception signal (for example, see FIG. 4C).

The band-pass filter 122 is inserted as necessary in order to remove an interference signal and noise having frequency components that do not contribute to a radar operation from among reception signals received via the reception antenna 121. Here, the band-pass filter 122 is inserted between the reception antenna 121 and the low noise amplifier 123.

The low noise amplifier 123 is inserted as necessary in order to maintain a preferable ratio between a signal and noise. Here, the low noise amplifier 123 is inserted between the band-pass filter 122 and the balanced modulator 124.

The balanced modulator 124 modulates a phase of the signal received via the reception antenna 121 and outputted via the band-pass filter 122, the low noise amplifier 123 and the like, based on the PN code supplied from the reception PN code generating unit 104, and outputs the modulation signal shown in FIG. 4D. In this case when the code delay time τ of the reception PN code generating unit 104 to the transmission PN code generating unit 103 is equivalent to the delay time corresponding to the distance to a detection target, there is a match between a phase of the PN code included in the received detection radio wave and a phase of the PN code supplied from the reception PN code generating unit 104, the signal which is spectrum spread over a wide band is despread and reconstructed, and a signal having the $f_c-f_1$ frequency and a signal having the $f_c+f_1$ frequency are outputted. On the other hand, when the code delay time τ is different from the delay time corresponding to the distance to the detection target, the output signal is kept spectrum spread over a wide band. Then, compared to the case where there is a match between the time τ and the delay time, the intensity of the signal component at the frequency $f_c-f_1$ and the signal component having the $f_c+f_1$ frequency are respectively attenuated by the amount determined by the autocorrelation characteristic of the PN code.

Using the M sequence code which is well known as the PN code, the autocorrelation peaks only when there is a match in phases of the PN code. Therefore, the control unit 106 can monitor the output of the balanced modulator 124 while sequentially varying the delay time of the PN code and calculate the presence or absence of an obstacle and a distance to the obstacle based on the delay time when the signal having the $f_c-f_1$ frequency and the signal having the $f_c+f_1$ frequency appear.

Figure 4E:
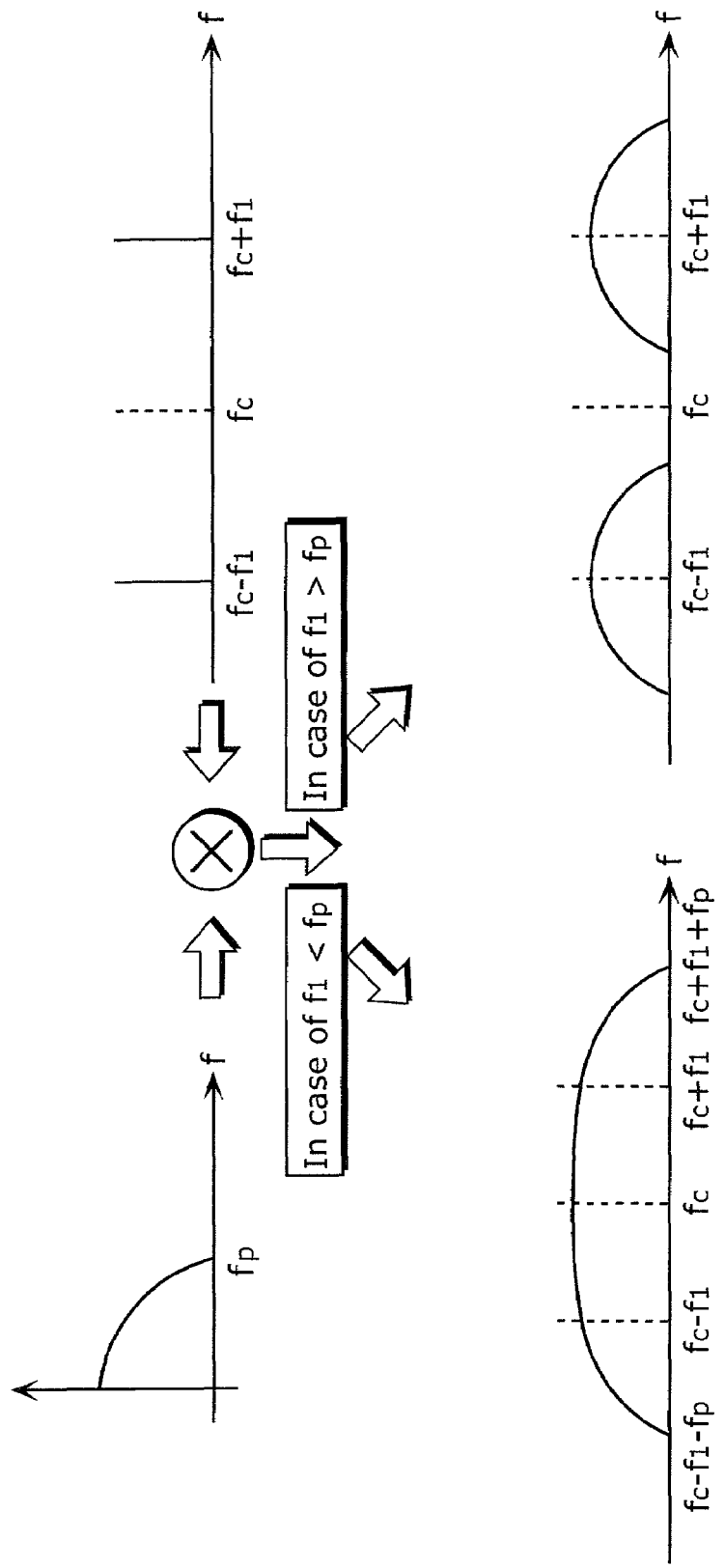
FIG. 4E is a diagram showing a relationship between the dual-frequency signal and the PN code in the spread spectrum radar apparatus according to the first embodiment.

Here, as shown in FIG. 4E, it is preferable that the frequency $f_p$ of the PN code is larger than the frequency $f_1$ of the reference signal. This indicates that when the frequency $f_p$ of the PN code is smaller than the frequency $f_1$ of the reference signal, a modulation signal having the frequency $f_c$ of the oscillator signal as the center value is divided into two. With this, in order to conform to requirements of laws and regulations regarding emission of electromagnetic waves and the like, it is normally necessary to provide a band-pass filter that selects either of the two modulation signals. As a result, half of electric power of such modulation signal is lost. For this, when the frequency $f_p$ of the PN code becomes larger than the frequency of $f_1$ of the reference signal, it is possible to prevent modulation signals from being divided. Furthermore, it is possible to effectively use all electric power of such modulation signal. Furthermore, it is not necessary to provide the band-pass filter that selects either of the modulation signals.

The quadrature demodulator 125 uses the signal having the frequency $f_c$ supplied from the transmission unit 101, and converts, into an in-phase signal and a quadrature signal which respectively have intermediate frequencies, the modulation signal outputted from the balanced modulator 124, in other words, the signal on which despread processing has been performed.

The band-pass filters 126 and 128 removes an unnecessary interference signal, and only allows the frequency component of $f_1 \pm f_d$ to pass. In this case, the frequency component which is necessary as an output signal of the quadrature demodulator 125 is a frequency of $f_1 \pm f_d$ shifted from $f_1$ of the local oscillator 112 by the Doppler shift $f_d$ corresponding to a relative velocity between the detection target and the spread spectrum radar apparatus.

The amplifier 127 amplifies the signal outputted from the band-pass filter 126 and outputs the amplified signal to the signal processing unit 105.

The amplifier 129 amplifies the signal outputted from the band-pass filter 128 and outputs the amplified signal to the signal processing unit 105.

It should be noted that a signal outputted from the balanced modulator 124 is a signal having a very wide dynamic range depending on a reflectivity coefficient of an obstacle and the distance to the obstacle. For example, when a 24 GHz sub-millimeter waveband is adopted as a frequency of a detection radio wave and an antenna having a gain property of 15 dBi is provided respectively in reception and transmission antennas, a dynamic range of approximately 100 dB is necessary in view of reception electric power: used when a target with a reflection efficiency of approximately −5 dBsm as a radar cross-sectional area, such as a bicycle at a distance of 20 meters is detected; and used when transmission power is inputted in a receiver without any loss with the reflection from an object fairly at point-blank range or from an object with a large radio wave reflection efficiency, such as a metal plate.

For this, it becomes possible to dramatically relax the input dynamic range requirements of the signal processing unit 105, using a logarithmic amplifier in the amplifiers 127 and 129. Furthermore, even when a reception signal is over a dynamic range of approximately 100 dB, it can be handled in the signal processing unit 105 in a relatively easy manner. In this case, it is possible to transmit, to the signal processing unit 105, information of the intensity A and a phase φ of the reception signal without losing both of the information, using a logarithmic amplifier that can output a signal (a) which is proportional to a logarithm of the intensity of the input signal and (b) which is amplified by limiting amplitude of the input signal. As a result, it is possible to measure a distance to the obstacle and the relative velocity for the obstacle.

Next, the quadrature demodulator according to the first embodiment is described.

The quadrature demodulator 125 further includes a phase shifter 125a and balanced modulators 125b and 125c.

The local oscillator 111 supplies a signal having the frequency $f_c$ to the phase shifter 125a, and the phase shifter 125a outputs a signal having a phase which is different from the phase of the supplied signal by 90 degrees.

The balanced modulator 125b mixes (multiplies) the signal outputted from the balanced modulator 124 and the signal having the frequency $f_c$ which is supplied from the local oscillator 111, and outputs the mixed signal.

The balanced modulator 125c mixes (multiplies) the signal outputted from the balanced modulator 124 and the signal outputted from the phase shifter 125a, and outputs the mixed signal.

Here, it is assumed that the output signal of the balanced modulator 124 is R(t), the output signal of the balanced modulator 125b is I(t), and the output signal of the balanced modulator 125c is Q(t). Note that R(t) is a signal which is obtained by mixing the oscillator signal supplied from the local oscillator 111 and the reference signal supplied from the local oscillator 112 and despreading the resulting signal, and which is outputted from the balanced modulator 113 of the transmission unit, and that the signal is a signal obtained by delaying the output signal of the balanced modulator 113 by the time τ during the process when the resulting signal is reconstructed by despreading the signal after a round-trip transmission between the spread spectrum radar apparatus and the obstacle. The aforementioned signals are expressed by the following Expressions 1 to 3.

$$R(t) = A\cos\{2\pi f_c(t-\tau) + \phi_c\}\cos\{2\pi f_1(t-\tau) + \phi_1\} \quad \text{[Expression 1]}$$
$$= A\cos(2\pi f_c t + \phi_c + \Delta\phi_c)\cos(2\pi f_1 t + \phi_1 + \Delta\phi_1)$$

$$I(t) = \cos(2\pi f_c t)R(t) \quad \text{[Expression 2]}$$
$$= \frac{A}{2}\cos(\phi_c + \Delta\phi_c)\cos(2\pi f_1 t + \phi_1 + \Delta\phi_1) +$$
$$\frac{A}{2}\cos(4\pi f_c t + \phi_c + \Delta\phi_c)\cos(2\pi f_1 t + \phi_1 + \Delta\phi_1)$$

$$Q(t) = \sin(2\pi f_c t)R(t) \quad \text{[Expression 3]}$$
$$= \frac{A}{2}\sin(\phi_c + \Delta\phi_c)\cos(2\pi f_1 t + \phi_1 + \Delta\phi_1) +$$
$$\frac{A}{2}\sin(4\pi f_c t + \phi_c + \Delta\phi_c)\cos(2\pi f_1 t + \phi_1 + \Delta\phi_1)$$

Here, $\phi_c$ denotes a phase of a carrier wave, and $\Delta\phi_c = -2\pi f_c \tau$ denotes phase rotation of the carrier wave by the transmission delay. Furthermore, $\phi_1$ denotes a phase of a reference signal, and $\Delta\phi_1 = -2\pi f_1 \tau$ denotes phase rotation of the carrier wave by the transmission delay.

Furthermore, it is assumed that I'(t) is the signal which is outputted via the band-pass filter 126 from among frequency components of I(t), and Q'(t) is the signal which is outputted via the band-pass filter 128 from among frequency components of Q(t). The aforementioned signals are expressed by the following Expressions (4) to (5).

$$I'(t) = \frac{A}{2}\cos(\phi_c + \Delta\phi_c)\cos(2\pi f_1 t + \phi_1 + \Delta\phi_1) \quad \text{[Expression 4]}$$

$$Q'(t) = -\frac{A}{2}\sin(\phi_c + \Delta\phi_c)\cos(2\pi f_1 t + \phi_1 + \Delta\phi_1) \quad \text{[Expression 5]}$$

Here, assuming that the signal intensity of I'(t) which is expressed by Expression 4 and the signal intensity of Q'(t) which is expressed by Expression 5 are AI and AQ respectively, AI is expressed by Expression 6 and AQ is expressed by Expression 7. Then, by using AI and AQ, the signal intensity A of the reception signal can be calculated as in Expression 8. Furthermore, the phase $\phi_c + \Delta\phi_c$ can be obtained by Expressions 9 and 10, using I'' expressed by Expression 11 and Q'' expressed by Expression 12. Expression 11 is an expression that obtains, as a direct current component, a result by multiplying a signal obtained by limiting I'(t) and a reference signal, and Expression 12 is an expression that obtains, as a direct current component, a result by multiplying a signal obtained by limiting amplitude of Q'(t) and the reference signal.

With this, it becomes possible to judge whether or not the obstacle is present by checking the signal intensity A with the reference value, and to measure the relative velocity based on time variations of the phase $\phi_c + \Delta\phi_c$ caused by the Doppler effect.

$$AI = \left|\frac{A}{2}\cos(\phi_c + \Delta\phi_c)\right| \quad \text{[Expression 6]}$$

$$AQ = \left|\frac{A}{2}\sin(\phi_c + \Delta\phi_c)\right| \quad \text{[Expression 7]}$$

$$A = 2\sqrt{AI^2 + AQ^2} \quad \text{[Expression 8]}$$

-continued $$\phi_c + \Delta\phi_c = \arctan\left(\frac{AQ}{AI}\right) + \phi_0 \quad \text{[Expression 9]}$$

$$\phi_0 = 0 \, (I'' > 0, Q'' > 0,), \quad \text{[Expression 10]}$$
$$\phi_0 = \frac{\pi}{2} \, (I'' < 0, Q'' > 0,),$$
$$\phi_0 = -\frac{\pi}{2} \, (I'' > 0, Q'' < 0,),$$
$$\phi_0 = -\pi \, (I'' < 0, Q'' < 0,)$$

$$I'' = \cos\Delta\phi_1 \cos(\phi_c + \Delta\phi_c) \quad \text{[Expression 11]}$$

$$Q'' = -\cos\Delta\phi_1 \sin(\phi_c + \Delta\phi_c) \quad \text{[Expression 12]}$$

Note that when it is not necessary to measure a relative velocity, it is possible to omit a signal amplified by limiting the amplitude and to simplify the configuration of the spread spectrum radar apparatus 100 so as to calculate the phase $\phi_c + \Delta\phi_c$ of the reception signal.

Note that when it is possible to allow the impairment of a part of information of intensity of a reception signal, either an in-phase signal or a quadrature signal can be omitted, and thus the configuration of the spread spectrum radar apparatus 100 can be further simplified. In this case, depending on a value of a phase rotation amount of a reception signal which is transmitted and received, the original intensity A of the reception signal is attenuated as shown in Expression 6 or 7.

Note that the large antenna power may be obtained using a power amplifier instead of the attenuator 116.

Here, the spread spectrum radar apparatus of the present invention is superior in a signal interference property between a transmitter and a receiver, compared to the conventional radar apparatus which uses, as a transmission signal, a signal obtained by spread-modulating a carrier signal having a single frequency using the code obtained by embedding data code in the PN code. In other words, generally, a spectrum-spread modulation signal includes large numbers of frequency components, and it is conceivable that these frequency components are leaked from the transmitter to the receiver and interferes with a reception signal within the receiver. In the present configuration, the primary frequency components of the modulation signal outputted from the balanced modulator 113 is a dual-frequency signal having the $f_c - f_1$ frequency and having the $f_c + f_1$ frequency within a transmitter. The number of the frequency components included in the spectrum spread signal outputted from the balanced modulator 114 is limited to double the number of the frequency components included in the signal in which the carrier signal having a single frequency is frequency-spread using the PN code. Furthermore, the frequency components are primarily dual-frequency signals, and distributed within a side band generated by modulating a signal using the frequency components included in the PN code itself. Thus, assuming that the code rate of the PN code is Rc, the primary frequency components remain within the range of $f_c \pm (R_c + f_1)$, and it is possible to make an intermediate frequency inside the receiver sufficiently lower than the frequency given in $f_c - (R_c + f_1)$. Consequently, it is possible to suppress the signal interference.

On the other hand, in the conventional technique which uses the code in which the data code is embedded in the PN code, it is necessary to match the intermediate frequency inside the receiver and the basic frequencies of the data code. However, the frequency components of the code in which the data code is embedded in the PN code are distributed in the frequency domain including the basic frequencies of the data code. Thus, due to the signal interference, the deterioration of receiving performance becomes apparent.

As described above, the spread spectrum radar apparatus 100 according to the first embodiment can ease the frequency stability required in an oscillator by generating, using a common local oscillator, a carrier wave supplied to the quadrature demodulator 125 and a carrier wave to be transmitted as a detection radio wave. In particular, the spread spectrum radar apparatus 100 can omit a function that stabilizes a frequency in high precision, such as a phase-locked loop. Furthermore, the signals outputted from the band-pass filters 126 and 128 are expressed by Expressions 4 and 5, and do not include a direct current component. Therefore, it is possible to omit the direct current amplifier. Furthermore, since the signal does not include a direct current component, it is possible to amplify the signal without a direct current amplifier while keeping the relatively wide dynamic range, without any effect of the direct current offset. Thus, it is possible to provide a radar apparatus: which has the configuration of a circuit in which a local oscillator is used in common at a reception and a transmission sides and does not require a phase-locked loop, a direct current amplifier, and the like; and which is inexpensive, has the high performance and a wide detection range.

Second Embodiment

Hereinafter, the second embodiment according to the present invention is described with reference to the diagrams.

The spread spectrum radar apparatus of the present embodiment includes the features (a) and (b) as shown below.

(a) The quadrature demodulator further includes: (a1) a phase shifter which alternately outputs the first oscillator signal and a third oscillator signal in which a shift amount with respect to the first oscillator signal is different by 90 degrees; and (a2) a balanced modulator which alternately generates the in-phase signal and the quadrature signal by mixing the modulation signal and the signal outputted from the phase shifter.

(b) The reception circuit further includes: (b1) a band-pass filter to which the in-phase signal and the quadrature signal are alternately inputted from the quadrature demodulator, and which allows a band from among frequency components of the in-phase signal and the quadrature signal, the band having a frequency of the second oscillator signal as a center frequency; and (b2) an amplifier which outputs a signal intensity and a signal amplified by limiting amplitude of a signal which has passed the band-pass filter, the signal intensity being proportional to a logarithm of intensity of the signal which has passed the band-pass filter.

More specifically, either an in-phase signal or a quadrature signal is alternately switched based on a phase amount switching signal supplied from a controller to the quadrature demodulator, and either of the signals is outputted from the quadrature demodulator.

In view of the aforementioned points, the spread spectrum radar apparatus according to the present embodiment is described. Note that the description of the constituent units of the second embodiment which are identical to the constituent units of the first embodiment is omitted using the same unit numbers.

First, the spread spectrum radar apparatus according to the present embodiment is described.

Figure 5:
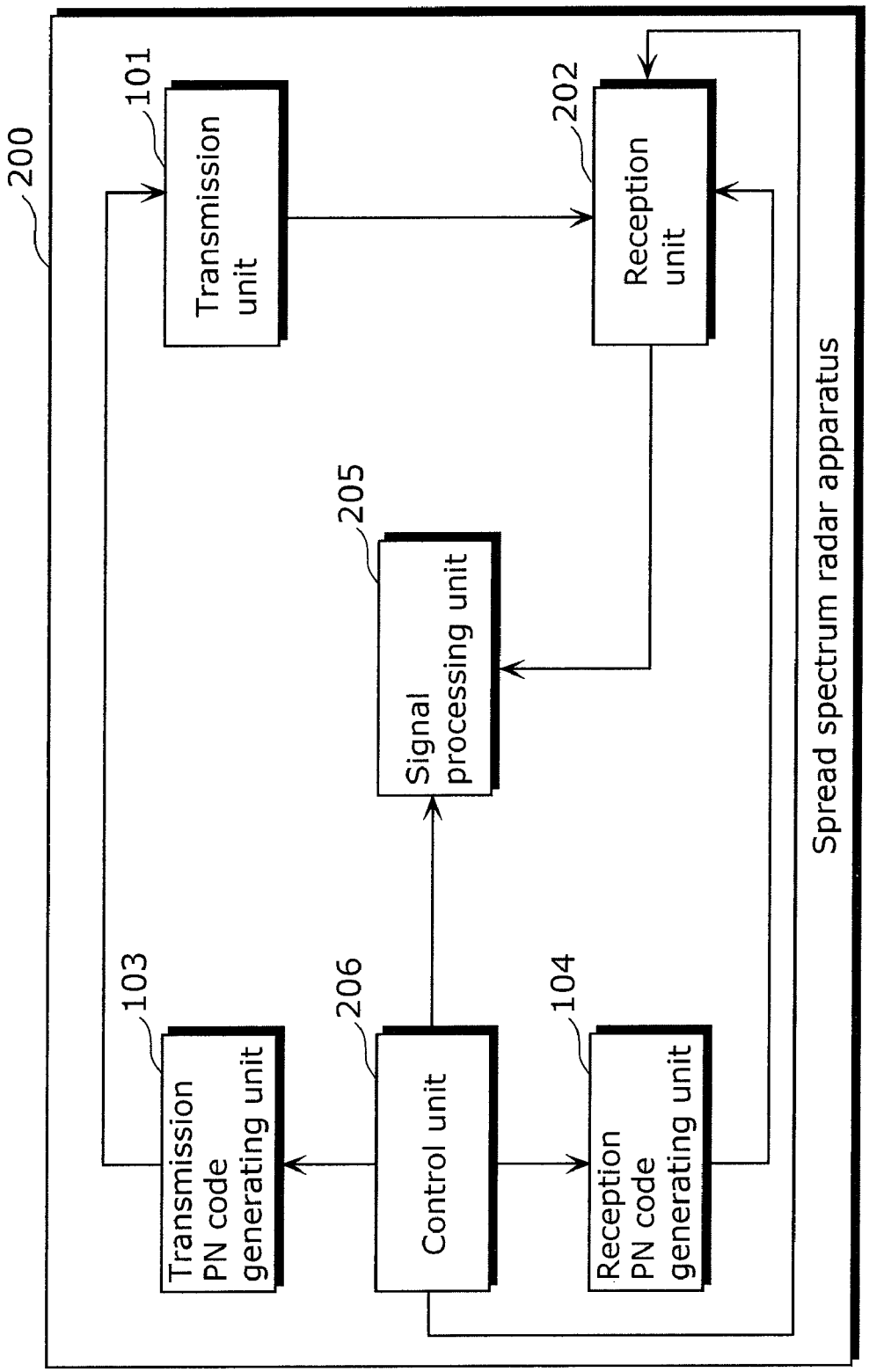
FIG. 5 is a diagram showing the configuration of the spread spectrum radar apparatus according to the second embodiment.

As shown in FIG. 5, the spread spectrum radar apparatus 200 differs from the spread spectrum radar apparatus 100 of the first embodiment (for example, refer to FIG. 2) in the following points (1) to (3).

(1) The spread spectrum radar apparatus 200 includes a reception unit 202 instead of the reception unit 102.

(2) The spread spectrum radar apparatus 200 includes a signal processing unit 205 instead of the signal processing unit 105.

The signal processing unit 205 calculates the presence or absence of an obstacle, a distance to the obstacle, and a relative velocity for the obstacle, based on: the delay time τ of the reception PN code generating unit 104 to the transmission PN code generating unit 103; and an inputted signal.

(3) The spread spectrum radar apparatus 200 also includes a control unit 206 instead of the control unit 106.

The control unit 206 supplies, to the quadrature demodulator 225 and the signal processing unit 205, the signal outputted from the quadrature demodulator 225 and the control signal which switches between a signal I'(t) and a signal Q'(t) respectively.

Note that one of a signal expressed by Expression 4 and a signal expressed by Expression 5 is inputted in the signal processing unit 205 according to the control signal supplied from the control unit 206 to the quadrature demodulator 225. Furthermore, a control signal that shifts a phase amount (referred to as phase amount switching signal hereinafter) is also inputted in the signal processing unit 205.

Next, the reception unit according to the second embodiment is described.

Figure 6:
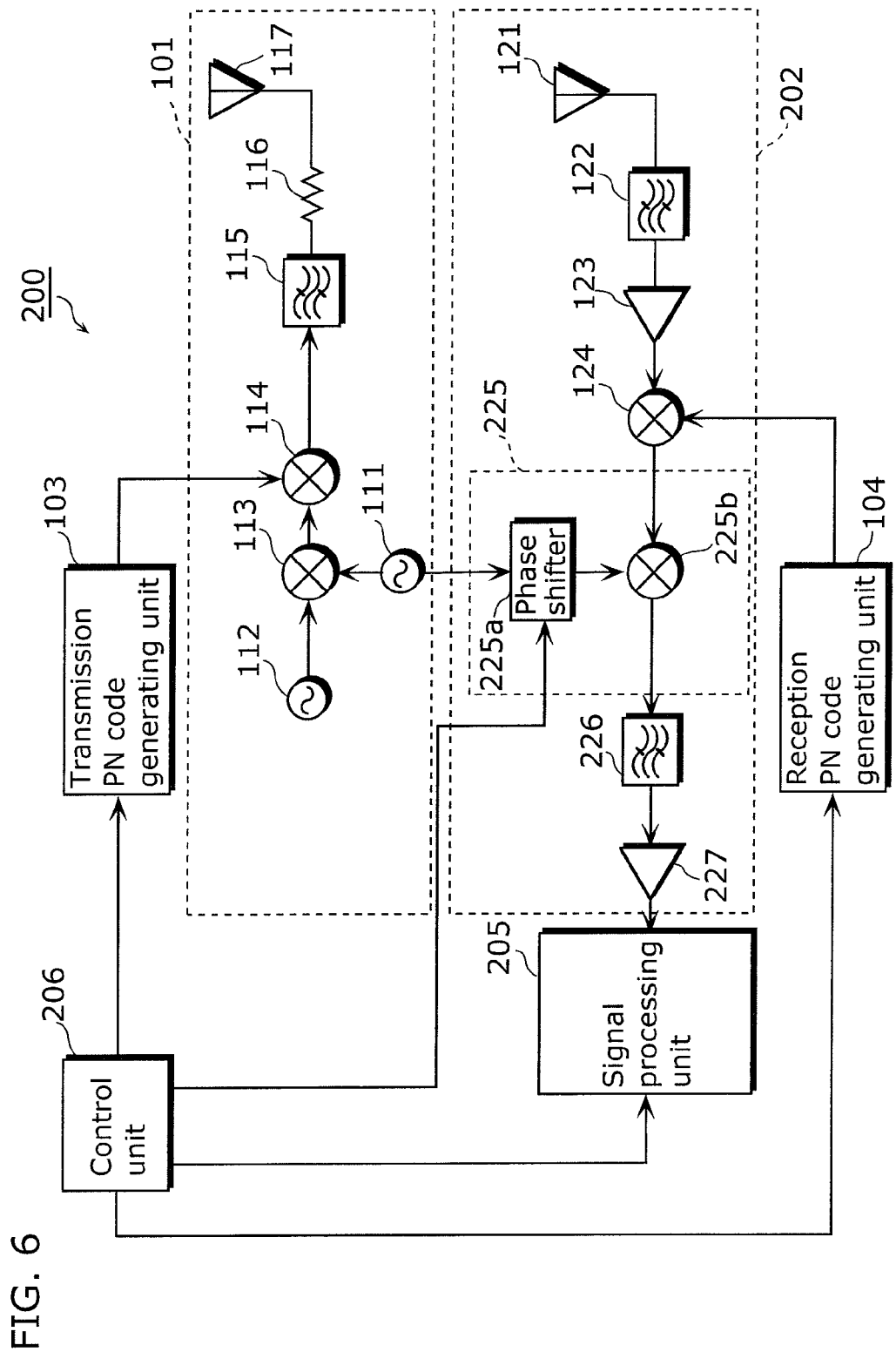
FIG. 6 is a diagram showing the circuit configuration of the spread spectrum radar apparatus according to the second embodiment.

As shown in FIG. 6, the reception unit 202 differs from the reception unit 102 in the following points (1) to (3).

(1) The reception unit 202 includes a quadrature demodulator 225 instead of the quadrature demodulator 125.

The quadrature demodulator 225 further includes a phase shifter 225a and a balanced modulator 225b.

The phase shifter 225a has a function of shifting a phase amount. More specifically, the phase shifter 225a switches a phase of the signal having the oscillation frequency $f_c$ which is supplied from the transmission unit 101, to either an in-phase signal or a quadrature signal, and outputs either of the signals, based on the phase amount switching signal supplied from the control unit 206.

The balanced modulator 225b mixes (multiplies) the signal outputted from the phase shifter 225a and the signal outputted from the balanced modulator 124, in other words, the signal which has been despread, and outputs the mixed signal. In this case, the signal in which either an in-phase or a quadrature phase is synchronously detected is outputted based on the phase amount switching signal supplied from the control unit 206 to the phase shifter 225a. More specifically, when the in-phase signal is outputted from the phase shifter 225a, a signal expressed by Expression 2 is outputted. On the other hand, when the signal outputted from the local oscillator 111 and a signal having a phase which differs by 90 degrees from the aforementioned signal are outputted from the phase shifter 225a, the signal expressed by Expression 3 is outputted.

(2) The reception unit 202 includes a band-pass filter 226 instead of the band-pass filters 126 and 128.

The band-pass filter 226 removes an unnecessary interference signal, and only allows the frequency component of $f_1 \pm f_d$ to pass.

(3) The reception unit 202 includes an amplifier 227 instead of amplifiers 127 and 129.

The amplifier 227 amplifies the signal outputted from the band-pass filter 226 and outputs the amplified signal to the signal processing unit 205.

With this, it is possible to unify, into a single band-pass filter, two band-pass filters required in the first embodiment.

As described above, the spread spectrum radar apparatus according to the second embodiment needs double the time required in the spread spectrum radar apparatus according to the first embodiment, when the signal quality equivalent to the signal quality in the first embodiment is to be obtained so as to alternately switch between an in-phase signal and a quadrature signal. Furthermore, there are cases where it is not possible to obtain an accurate signal because a position of an obstacle, which moves at a high velocity, moves during a period when a signal alternately switches between an in-phase signal and a quadrature signal. However, when such case is acceptable, for example, when the apparatus is used for an easy application, it is possible to unify communication paths of signals between a quadrature demodulator and a signal processor into a single path, and to simplify the configuration of the apparatus.

Third Embodiment

Hereinafter, the third embodiment according to the present invention is described with reference to the diagrams.

The spread spectrum radar apparatus of the present embodiment includes a feature (a) as shown below.

(a) The spread spectrum radar apparatus further includes a random signal generating circuit which generates a random signal that randomly changes a frequency of the first oscillator signal.

In view of the aforementioned point, the spread spectrum radar apparatus according to the present embodiment is described. Note that the description of the constituent units of the third embodiment which are identical to the constituent units of the first embodiment is omitted using the same unit numbers.

First, the spread spectrum radar apparatus according to the present embodiment is described.

Figure 7:
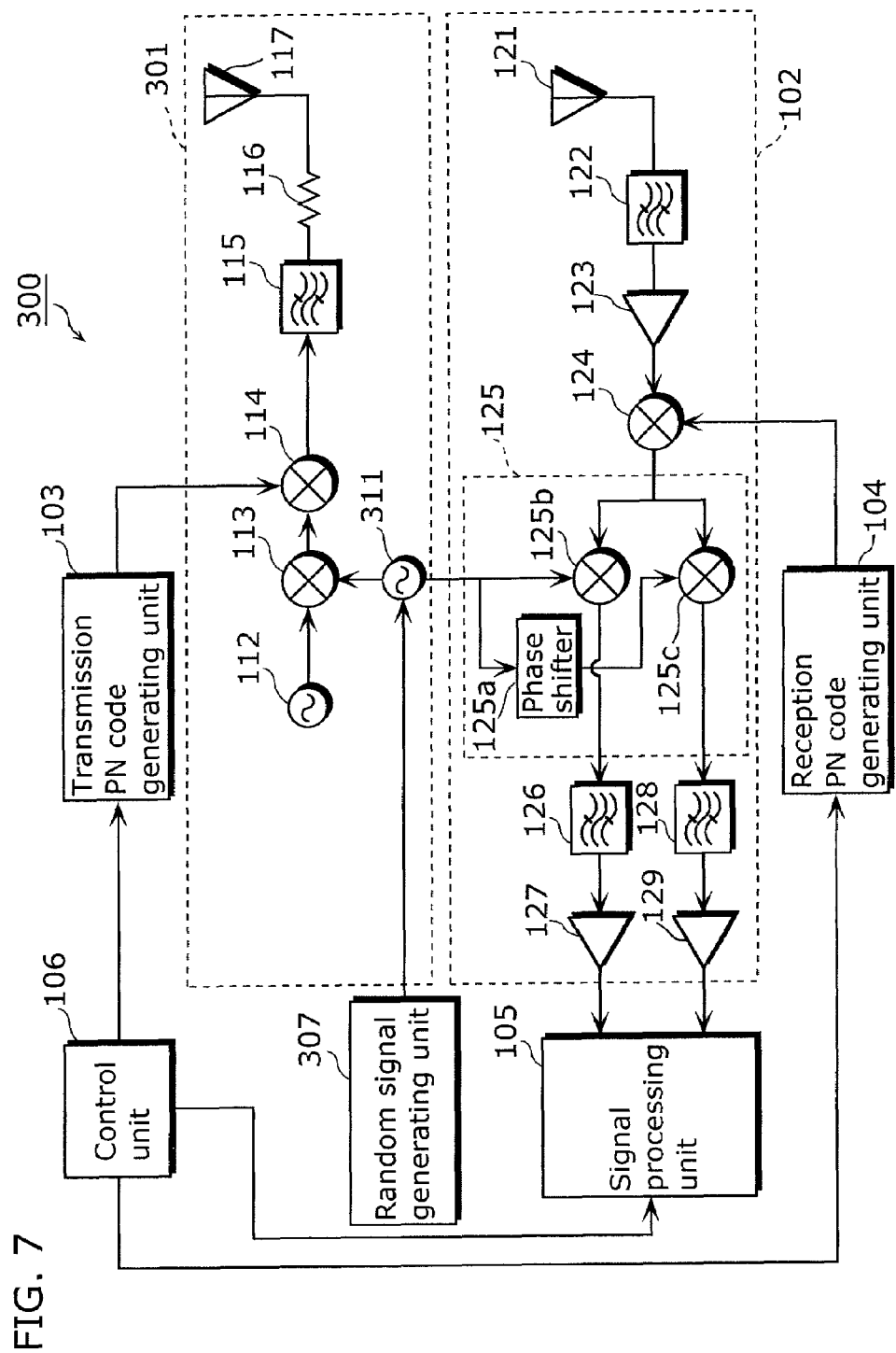
FIG. 7 is a diagram showing the circuit configuration of the spread spectrum radar apparatus according to the third embodiment.

As shown in FIG. 7, the spread spectrum radar apparatus 300 differs from the spread spectrum radar apparatus 100 of the first embodiment (for example, refer to FIG. 3) in the following points (1) and (2).

(1) The spread spectrum radar apparatus 300 includes a transmission unit 301 instead of the transmission unit 101.

The transmission unit 301 includes a local oscillator 311 instead of the local oscillator 111.

The local oscillator 311 generates an oscillator signal by discretely or continuously varying the frequency according to the random signal supplied from a random signal generating unit 307. Here, as an example, the frequency of an oscillator signal is varied based on the pass band of the band-pass filters 126 and 128.

For example, when the random signal is not supplied, it is assumed that the frequency of the oscillator signal supplied from the local oscillator 311 is $f_1$. For example, when the random signal is supplied, it is assumed that the frequency of the oscillator signal supplied from the local oscillator 311 is $f_1 \pm \Delta f_r$. Here, the displacement $\Delta f_r$ is the frequency which varies according to the random signal. Furthermore, it is assumed that the frequency of the reference signal supplied from the local oscillator 112 is $f_2$. It is assumed that the upper limit of the pass band of the band-pass filters 126 and 128 is $f_{bh}$ and the lower limit is $f_{bl}$. In this case, the displacement $\Delta f_r$ varies within a range in which conditions "$\Delta f_r > f_{bh} - f_2$" and "$\Delta f_r > f_2 - f_{bl}$" are satisfied. Note that when a Doppler shift $f_d$ is considered, the displacement $\Delta f_r$ varies within a range in which conditions "$\Delta f_r > f_{bh} - f_2 + f_d$" and "$\Delta f_r > f_2 - f_{bl} + f_d$" are satisfied.

(2) The spread spectrum radar apparatus 300 newly includes a random signal generating unit 307.

The random signal generating unit 307 generates a random signal and supplies the generated random signal to the local oscillator 311.

The following describes a case where: a desirable reflected wave is received via the reception antenna 121; a modulation signal ranging between the frequency $f_1 + f_2$ and the frequency $f_1 - f_2$ is outputted from the balanced modulator 124; and when an interfering wave is received, an interfering signal of the frequency $f_1 + f_2$ is leaked from the balanced modulator 124.

In this case, since an oscillator signal is supplied to the balanced modulators 125b and 125c, the modulation signal in which the frequency varies according to the random signal is demodulated without any problem. On the other hand, when an interfering signal having a constant frequency is demodulated by the balanced modulators 125b and 125c using a signal removed at the band-pass filter 126 and 128.

With this, since the frequency of the modulation signal is fixed without the random signal generating unit 307, it is not possible to distinguish between an interfering signal and a modulation signal. On the other hand, as long as the frequency of the interfering signal does not vary according to the random signal, the spread spectrum radar apparatus can distinguish between an interfering signal and a modulation signal.

Thus, the spread spectrum radar apparatus 300 according to the present embodiment can distinguish between a interfering signal leaked from the balanced modulator 124 due to the interfering wave and a modulation signal which is reflected from a desirable reflected wave and outputted from the balanced modulator 124, even when the signals have a similar frequency.

Fourth Embodiment

Hereinafter, the fourth embodiment according to the present invention is described with reference to the diagrams.

The spread spectrum radar apparatus of the present embodiment includes the features (a) and (b) as shown below.

(a) A spread spectrum radar apparatus which: modulates a first oscillator signal with a first pseudo-noise code; emits, as a detection radio wave, a spread signal that is a spectrum-spread signal; receives, as a reception signal, the detection radio wave reflected from an object; and generates a demodulation signal by despreading the reception signal based on a second pseudo-noise code and the first oscillator signal, the apparatus includes: (a1) a repetition code generating circuit which generates a repetition code by generating a code using a predetermined frequency; and (a2) an exclusive OR operation circuit which outputs, as the second pseudo-noise code, a result obtained by performing an exclusive OR operation between the repetition code and a pseudo-noise code obtained by delaying the first pseudo-noise code.

(b) The repetition code generating circuit and the exclusive OR operation circuit are integrated in a semiconductor integrated circuit.

In view of the aforementioned points, the spread spectrum radar apparatus according to the present embodiment is described. Note that the description of the constituent units of the fourth embodiment which are identical to the constituent units of the first embodiment is omitted using the same unit numbers.

First, the spread spectrum radar apparatus according to the present embodiment is described.

Figure 8A:
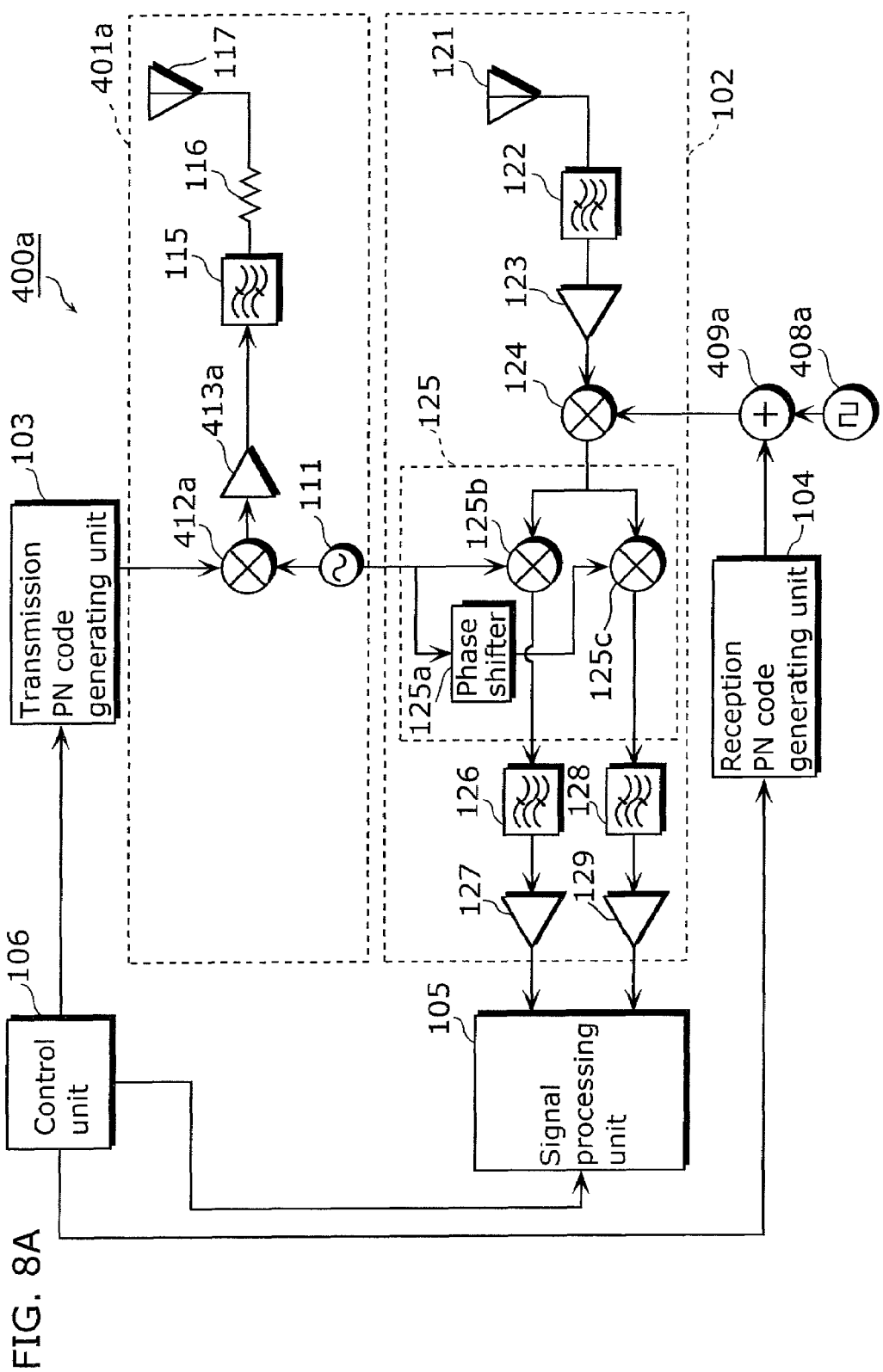
FIG. 8A is a diagram showing the circuit configuration of the spread spectrum radar apparatus according to the fourth embodiment.

As shown in FIG. 8A, the spread spectrum radar apparatus 400a differs from the spread spectrum radar apparatus 100 of the first embodiment (for example, refer to FIG. 3) in the following points (1) to (3).

(1) The spread spectrum radar apparatus 400a includes a transmission unit 401a instead of the transmission unit 101.

The transmission unit 401a includes a balanced modulator 412a and an amplifier 413a instead of the local oscillator 112, the balanced modulator 113, and the balanced modulator 114.

In this case, the balanced modulator 412a modulates a phase of the oscillator signal (for example, 24 GHz) supplied from the local oscillator 111 based on the PN code supplied from the transmission PN code generating unit 103, and outputs the resulting modulation signal. The amplifier 413a amplifies the modulation signal outputted from the balanced modulator 412a, and outputs the amplified signal. Then, the signal outputted from the amplifier 413a is emitted, as a detection radio wave, via the band-pass filter 115, the attenuator 116, and the transmission antenna 117.

(2) The spread spectrum radar apparatus 400a newly includes a repetition code generator 408a.

The repetition code generator 408a generates a repetition code such as "1,0,1,0, . . . ", and supplies the repetition code to an exclusive OR operator 409a. Here, as an example, the repetition code is generated using 455 kHz.

Note that it is preferable that a half of a clock frequency of the repetition code is one-integer-th of a frequency of a cycle of the first pseudo-noise code in order to improve the correlation characteristic of the reception signal. Here, when the repetition code is "1,0,1,0, . . . ", the half of the clock frequency indicates a frequency of a square wave itself of the repetition code.

(3) The spread spectrum radar apparatus 400a newly includes an exclusive OR operator 409a.

The exclusive OR operator 409a calculates an exclusive OR between the PN code supplied from the reception PN code generating unit 104, and the repetition code supplied from the repetition code generator 408a, and outputs the resulting code to the balanced modulator 124 of the reception unit 102.

Note that it is assumed that the repetition code generator 408a and the exclusive OR operator 409a are integrated in a semiconductor integrated circuit as an example here. Even when the code outputted from the exclusive OR operator 409a is outputted outside the semiconductor integrated circuit, the repetition code supplied from the repetition code generator 408a is not outputted. With this, as long as the repetition code is not leaked onto a printed circuit board, it is possible to prevent an effect on a very weak signal which has passed the quadrature demodulator 125, using a signal leaked from the repetition code generator 408a when the frequency or the harmonics of the repetition code is selected by the band-pass filters 126 and 128 and the signal is amplified by the amplifiers 127 and 129.

Figure 8B:
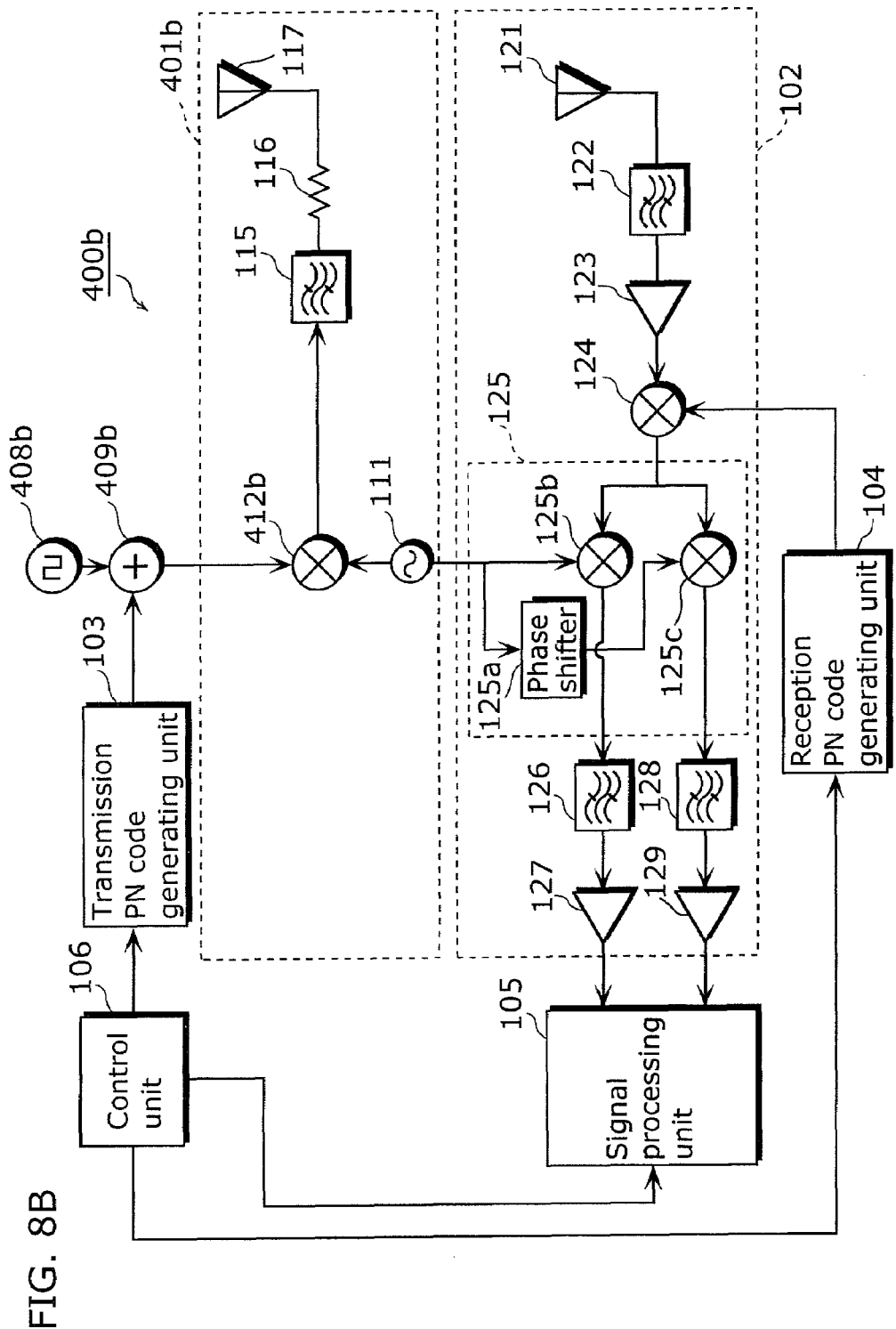
FIG. 8B is a diagram showing the circuit configuration of the spread spectrum radar apparatus according to the fourth embodiment.

Furthermore, as shown in FIG. 8B, it is possible that the repetition code generator 408b and the exclusive OR operator 409b are integrated in a semiconductor integrated circuit and included in the transmission side. In this case, the transmission unit 401b includes a balanced modulator 412b instead of the local oscillator 112, the balanced modulator 113, and the balanced modulator 114. Furthermore, the balanced modulator 412b modulates, based on the code outputted from the exclusive OR operator 409b, a phase of the oscillator signal (for example, 24 GHz) supplied from the local oscillator 111, and outputs the resulting modulation signal. Then, the signal outputted from the balanced modulator 412a is emitted as a detection radio wave via the band-pass filter 115, the attenuator 116, and the transmission antenna 117. With this, as long as the repetition code is not leaked onto a printed circuit board, it is possible to prevent an effect on a reception unit 102, using a signal leaked from the repetition code generator 408b.

However, there is an advantage that effect of a spurious signal is small when the repetition code generator 408b and the exclusive OR operator 409b are included in the reception side, rather than in the transmission side. This is because a modulation signal is generated just by modulating a single spectrum of a sinusoidal wave at the transmission side. As a result, the number of spectrum included in the modulation signal becomes small, and the spurious signal less frequently occurs when the signal is inter-modulated using an amplifier at the reception side. Thus, there is an advantage that the autocorrelation characteristic is not frequently deteriorated and a reception signal is not frequently interfered with the spurious emission.

Thus, the spread spectrum radar apparatus 400a of the present embodiment directly modulates a carrier wave and the transmission PN code in the transmission unit 401a. The signal obtained by the modulation is emitted as a detection radio wave via the transmission antenna 117 and the like. Then, using the signal obtained by performing an exclusive OR operation between the reception PN code obtained by delaying the transmission PN code, the repetition code is despread in the balanced modulator 124.

For example, in the conventional technology, an exclusive OR is calculated between the data supplied from a data source (bits) and the transmission PN code in the transmission side. Then, since the code obtained from the exclusive OR is modulated using the oscillator signal supplied from the local oscillator, large numbers of spectrums caused by the bits appear in each of the frequencies of spectrum for the signal obtained by the modulation. With this, since spectrums become very large in number, the inter-modulation between the spectrums occurs due to the non-linearity caused by the balanced modulator 412a, the amplifier 413a, the low-noise amplifier 123, and the like. With this, the despread processing in the reception side deteriorates the correlation characteristic with the delaying PN code, and a ratio of noise to peak in output of the reception signal becomes lower. In other words, such case is equivalent to a case where an object having high reflectivity properties is masked by an object having low reflectivity properties. Thus, the object detection capability of the spread spectrum radar apparatus decreases.

However, with the spread spectrum radar apparatus 400a of the present embodiment, the number of spectrums in the signal, which is emitted from the transmission unit 401a as a detection radio wave, becomes small. Thus, the signal is less influenced by the inter-modulation.

Other Variation

Note that the transmission circuit may generate an intermediate signal by modulating a phase of the second oscillator signal based on the first pseudo-noise code, and generate a spread signal by mixing the intermediate signal and the first oscillator signal.

Here, (a) the transmission circuit further includes: (b) a first local oscillator which generates the first oscillator signal; (c) a second local oscillator which generates the second oscillator signal; (d) a first balanced modulator which generates the intermediate signal by modulating a phase of the second oscillator signal based on the first pseudo-noise code; and (e) a second balanced modulator which generates the spread signal by mixing the intermediate signal and the first oscillator signal.

For example, as shown in FIG. 9A, the spread spectrum radar apparatus may include a transmission unit 101a instead of the transmission unit 101. In this case, the transmission unit 101a includes local oscillators 111a and 112a, and balanced modulator 113a and 114a instead of the local oscillator 111 and the balanced modulators 113 and 114. In this case, the balanced modulator 113a modulates a phase of the reference signal (for example, 455 kHz) supplied from the local oscillator 112a based on the PN code supplied from the transmission PN code generating unit 103, and outputs the resulting modulation signal. The balanced modulator 114a mixes (multiplies) an oscillator signal (for example, 24 GHz) supplied from the local oscillator 111a and the modulation signal outputted from the balanced modulator 113a, and outputs the resulting signal. Then, the signal outputted from the balanced modulator 114a is emitted as a detection radio wave via the band-pass filter 115, the attenuator 116, the transmission antenna 117, and the like.

Note that the transmission circuit may generate an intermediate signal by modulating a phase of the first oscillator signal based on the first pseudo-noise code, and generate a spread signal by mixing the intermediate signal and the second oscillator signal.

Here, the transmission circuit further includes: (a) a first local oscillator which generates the first oscillator signal; (b) a second local oscillator which generates the second oscillator signal; (c) a first balanced modulator which generates the intermediate signal by modulating a phase of the first oscillator signal based on the first pseudo-noise code; and (d) a second balanced modulator which generates the spread signal by mixing the intermediate signal and the second oscillator signal.

For example, as shown in FIG. 9B, the spread spectrum radar apparatus may include a transmission unit 101b instead of the transmission unit 101. In this case, the transmission unit 101b includes local oscillators 111b and 112b, and balanced modulators 113b and 114b instead of the local oscillators 111 and 112, and the balanced modulators 113 and 114.

In this case, the balanced modulator 113b modulates, based on the PN code outputted from the transmission PN code generating unit 103, a phase of the oscillator signal (for example, 24 GHz) supplied from the local oscillator 111b, and outputs the resulting modulation signal. The balanced modulator 114b mixes (multiplies) a reference signal (for example, 455 kHz) supplied from the local oscillator 112b and the modulation signal outputted from the balanced modulator 113b, and outputs the resulting signal. Then, the signal outputted from the balanced modulator 114b is emitted as a detection radio wave via the band-pass filter 115, the attenuator 116, the transmission antenna 117, and the like.

Figure 10:
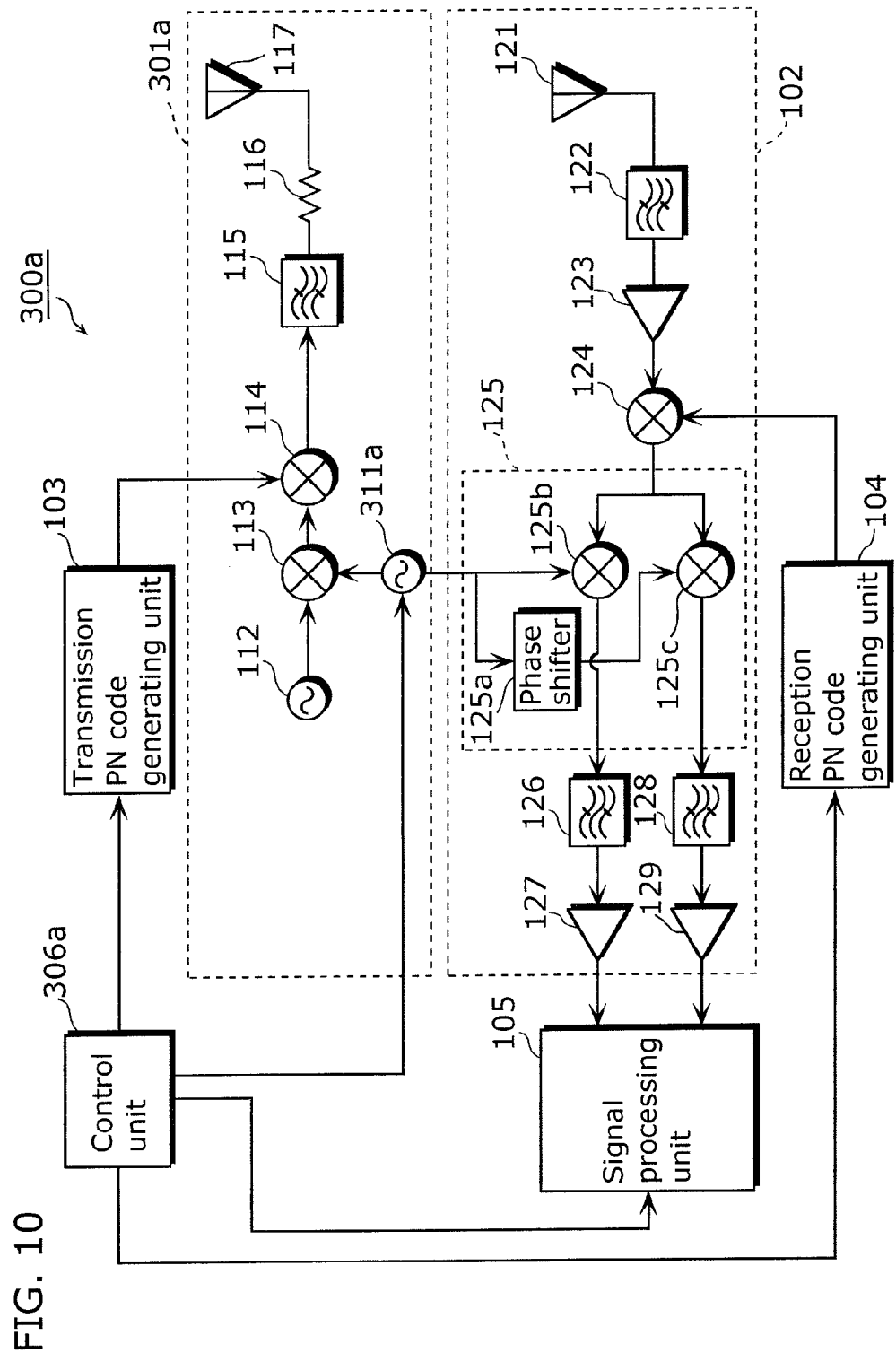
FIG. 10 is a diagram showing the circuit configuration of the spread spectrum radar apparatus according to the other variation embodiment.

Note that as shown in FIG. 10, the frequency of the oscillator signal supplied from the local oscillator 311 may vary according to the control signal supplied from the control unit 306a to the local oscillator 311, instead of the random signal generating unit 307.

Note that the local oscillator 111 may supply an oscillator signal using a single-end signal and supply an oscillator signal using a differential signal.

INDUSTRIAL APPLICABILITY

The present invention can be used as a radar apparatus and the like which is inexpensive and provides high performance.

The invention claimed is:

1. A spread spectrum radar apparatus, comprising:
   a first local oscillator which generates a first oscillator signal;
   a second local oscillator which generates a second oscillator signal;
   a first pseudo-noise code generating circuit which generates a first pseudo-noise code;
   a second pseudo-noise generating circuit which generates a second pseudo-noise code;
   a transmission circuit which generates a spread signal that is a spectrum-spread signal, using the first oscillator signal, the second oscillator signal, and the first pseudo-noise code, and which emits the spread signal as a detection radio wave; and
   a reception circuit which receives, as a reception signal, the detection radio wave reflected from an object, and which generates an intermediate frequency signal by the reception circuit despreading a spectrum of the reception signal based on the first oscillator signal and the second pseudo-noise code being generated by delaying the first pseudo-noise code,
   wherein a frequency associated with the first pseudo-noise code is higher than a frequency of the second oscillator signal.

2. The spread spectrum radar apparatus according to claim 1, the reception circuit comprising:
   a balanced modulator which generates a modulation signal by modulating a phase of the reception signal based on the second pseudo-noise code to despread the spectrum of the reception signal; and
   a quadrature demodulator which outputs, as the intermediate frequency signal, an in-phase signal and a quadrature signal which are included in the modulation signal.

3. The spread spectrum radar apparatus according to claim 2,
   wherein the quadrature demodulator includes:
   a phase shifter which generates a third oscillator signal in which a shift amount with respect to the first oscillator signal is different by 90 degrees;
   a first balanced modulator which generates the in-phase signal by mixing the modulation signal and the first oscillator signal; and
   a second balanced modulator which generates the quadrature signal by mixing the modulation signal and the third oscillator signal.

4. The spread spectrum radar apparatus according to claim 2, wherein the reception circuit includes:
   a first band-pass filter to which the in-phase signal is inputted from the quadrature demodulator, and which allows a band from among frequency components of the in-phase signal to pass, the band having the frequency of the second oscillator signal as a center frequency;
   a second band-pass filter to which the quadrature signal is inputted from the quadrature demodulator, and which allows a band from among frequency components of the quadrature signal to pass, the band having the frequency of the second oscillator signal as the center frequency;
   a first amplifier which outputs a signal intensity and a signal amplified by limiting an amplitude of a signal which has passed the first band-pass filter, the signal intensity being proportional to a logarithm of intensity of the signal which has passed the first band-pass filter; and
   a second amplifier which outputs a signal intensity and a signal amplified by limiting an amplitude of a signal which has passed the second band-pass filter, the signal intensity being proportional to a logarithm of intensity of the signal which has passed the second band-pass filter.

5. The spread spectrum radar apparatus according to claim 2,
   wherein the quadrature demodulator includes:
   a phase shifter which alternately outputs the first oscillator signal and a third oscillator signal in which a shift amount with respect to the first oscillator signal is different by 90 degrees; and
   a balanced modulator which alternately generates the in-phase signal and the quadrature signal by mixing the modulation signal and the signal outputted from the phase shifter.

6. The spread spectrum radar apparatus according to claim 2,
   wherein the reception circuit includes:
   a band-pass filter to which the in-phase signal and the quadrature signal are alternately inputted from the quadrature demodulator, and which allows a band from among frequency components of the in-phase signal and the quadrature signal to pass, the band having the frequency of the second oscillator signal as a center frequency; and
   an amplifier which outputs a signal intensity and a signal amplified by limiting an amplitude of a signal which has passed the band-pass filter, the signal intensity being proportional to a logarithm of intensity of the signal which has passed the band-pass filter.

7. The spread spectrum radar apparatus according to claim 2, further comprising:
a signal processing circuit which calculates an intensity of the reception signal based on the quadrature signal and the in-phase signal, checks the intensity with a reference value, and judges whether or not the object is present.

8. The spread spectrum radar apparatus according to claim 2, further comprising:
a signal processing circuit which identifies a time for which the first pseudo-noise code is delayed in order for the second pseudo-noise code to be generated, and which calculates, based on the in-phase signal and the quadrature signal, a distance to the object from the identified time.

9. The spread spectrum radar apparatus according to claim 2, further comprising:
a signal processing circuit which calculates a phase of the reception signal based on the second oscillator signal, the in-phase signal, and the quadrature signal, and calculates a relative velocity for the object based on time variations in the phase.

10. The spread spectrum radar apparatus according to claim 1,
wherein the transmission circuit generates an intermediate signal by mixing the first oscillator signal and the second oscillator signal, and generates the spread signal by modulating a phase of the intermediate signal based on the first pseudo-noise code.

11. The spread spectrum radar apparatus according to claim 10,
wherein the transmission circuit further includes:
a first balanced modulator which generates the intermediate signal by mixing the first oscillator signal and the second oscillator signal; and
a second balanced modulator which generates the spread signal by modulating a phase of the intermediate signal based on the first pseudo-noise code.

12. The spread spectrum radar apparatus according to claim 1,
wherein the transmission circuit generates an intermediate signal by modulating a phase of the second oscillator signal based on the first pseudo-noise code, and generates the spread signal by mixing the intermediate signal and the first oscillator signal.

13. The spread spectrum radar apparatus according to claim 12,
wherein the transmission circuit includes:
a first balanced modulator which generates the intermediate signal by modulating a phase of the second oscillator signal based on the first pseudo-noise code; and
a second balanced modulator which generates the spread signal by mixing the intermediate signal and the first oscillator signal.

14. The spread spectrum radar apparatus according to claim 1,
wherein the transmission circuit generates an intermediate signal by modulating a phase of the first oscillator signal based on the first pseudo-noise code, and generates the spread signal by mixing the intermediate signal and the second oscillator signal.

15. The spread spectrum radar apparatus according to claim 14,
wherein the transmission circuit further includes:
a first balanced modulator which generates the intermediate signal by modulating a phase of the first oscillator signal based on the first pseudo-noise code; and
a second balanced modulator which generates the spread signal by mixing the intermediate signal and the second oscillator signal.

16. The spread spectrum radar apparatus according to claim 1,
wherein the first pseudo-noise code generating circuit generates an M sequence code as the first pseudo-noise code; and
the second pseudo-noise code generating circuit generates the M sequence code as the second pseudo-noise code.

17. The spread spectrum radar apparatus according to claim 1, further comprising:
a random signal generating circuit which generates a random signal that randomly changes a frequency of the first oscillator signal.

18. The spread spectrum radar apparatus according to claim 1, wherein a frequency of the second oscillator signal is one-integer-th of a frequency of a cycle of the first pseudo-noise code.

19. A spread spectrum radar apparatus, comprising:
a first local oscillator which generates a first oscillator signal;
a first pseudo-noise code generating circuit which generates a first pseudo-noise code;
a second pseudo-noise generating circuit which generates a second pseudo-noise code;
a transmission circuit which modulates the first oscillator signal with the first pseudo-noise code, and which emits, as a detection radio wave, a spread signal that is a spectrum-spread signal;
a reception circuit which receives, as a reception signal, the detection radio wave reflected from an object, and which generates a demodulation signal by despreading the reception signal based on the second pseudo-noise code and the first oscillator signal;
a repetition code generating circuit which generates a repetition code by generating a code using a predetermined frequency; and
an exclusive OR operation circuit which outputs, as the second pseudo-noise code, a result obtained by performing an exclusive OR operation between the repetition code and a pseudo-noise code obtained by delaying the first pseudo-noise code.

20. The spread spectrum radar apparatus according to claim 19,
wherein the repetition code generating circuit and the exclusive OR operation circuit are integrated in a semiconductor integrated circuit.

21. The spread spectrum radar apparatus according to claim 19, wherein a half of a clock frequency of the repetition code is one-integer-th of a frequency of a cycle of the first pseudo-noise code.

22. A spread spectrum detection methods comprising:
generating a spread signal that is a spectrum-spread signal, using a first oscillator signal, a second oscillator signal, and a first pseudo-noise code, and emitting the spread signal as a detection radio wave to detect an object; and
receiving, as a reception signal, the detection radio wave reflected from the object, and generating an intermediate frequency signal by despreading a spectrum of the reception signal based on the first oscillator signal and a second pseudo-noise code obtained by delaying the first pseudo-noise code,
wherein a frequency associated with the first pseudo-noise code is higher than a frequency of the second oscillator signal.

* * * * *